(12) United States Patent
Tatsuta et al.

(10) Patent No.: US 8,953,017 B2
(45) Date of Patent: Feb. 10, 2015

(54) SOURCE DEVICE, SINK DEVICE, COMMUNICATION SYSTEM AND METHOD FOR WIRELESSLY TRANSMITTING THREE-DIMENSIONAL VIDEO DATA USING PACKETS

(75) Inventors: Akihiro Tatsuta, Kyoto (JP); Makoto Funabiki, Osaka (JP); Hiroshi Ohue, Osaka (JP); Hiroshi Mitani, Osaka (JP); Toshiroh Nishio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 756 days.

(21) Appl. No.: 13/318,930

(22) PCT Filed: Dec. 22, 2009

(86) PCT No.: PCT/JP2009/007120
§ 371 (c)(1),
(2), (4) Date: Nov. 4, 2011

(87) PCT Pub. No.: WO2010/131313
PCT Pub. Date: Nov. 18, 2010

(65) Prior Publication Data
US 2012/0044325 A1      Feb. 23, 2012

(30) Foreign Application Priority Data

May 14, 2009   (JP) .................................. 2009-117800
May 15, 2009   (JP) .................................. 2009-118982
Sep. 11, 2009  (JP) .................................. 2009-210416

(51) Int. Cl.
*H04N 13/00*       (2006.01)
(52) U.S. Cl.
CPC ....... *H04N 13/0066* (2013.01); *H04N 13/0059* (2013.01)
USPC ........................................................ 348/43

(58) Field of Classification Search
CPC .................................................. H04N 13/0055
USPC .......................................................... 348/43
See application file for complete search history.

(56) References Cited

U.S. PATENT DOCUMENTS 6,075,556 A  *   6/2000  Urano et al. .................... 348/43
7,461,095 B2 *  12/2008  Cohen et al. ........................ 1/1

(Continued)

FOREIGN PATENT DOCUMENTS

EP       1 024 672      8/2000
JP       7-46631        2/1995

(Continued)

OTHER PUBLICATIONS

International Preliminary Report on Patentability issued Dec. 22, 2011 in International (PCT) Application No. PCT/JP2009/007120.

(Continued)

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

A source device combines right-eye video frame data with left-eye video frame data into combined video frame data every video frame. Then, the source device generates a plurality of packets by dividing the combined video frame data into packets so as to insert information on a horizontal position for a horizontal display time interval and information on a vertical position for a vertical display time interval of a first pixel of the combined video frame data stored in the packets, into a header of each packet for transmitting the combined video frame data, as information for identifying right-eye video frame data and left-eye video frame data.

20 Claims, 14 Drawing Sheets

(56) References Cited

U.S. PATENT DOCUMENTS

| | | | |
|---|---|---|---|
| 8,339,967 B2* | 12/2012 | Kwon et al. | 370/242 |
| 8,365,034 B2* | 1/2013 | Kim et al. | 714/751 |
| 8,427,525 B2* | 4/2013 | Funabiki et al. | 348/43 |
| 8,471,893 B2* | 6/2013 | Kim et al. | 348/42 |
| 8,477,179 B2* | 7/2013 | Tatsuta et al. | 348/42 |
| 8,749,615 B2* | 6/2014 | Lipton et al. | 348/43 |
| 2002/0030675 A1 | 3/2002 | Kawai | |
| 2005/0062846 A1* | 3/2005 | Choi et al. | 348/42 |
| 2005/0248802 A1 | 11/2005 | Nomura et al. | |
| 2006/0130017 A1* | 6/2006 | Cohen et al. | 717/136 |
| 2006/0279750 A1 | 12/2006 | Ha | |
| 2007/0008575 A1 | 1/2007 | Yu et al. | |
| 2007/0230461 A1 | 10/2007 | Singh et al. | |
| 2008/0130741 A1 | 6/2008 | Chiang et al. | |
| 2008/0250294 A1 | 10/2008 | Ngo et al. | |
| 2009/0002481 A1* | 1/2009 | Kim et al. | 348/42 |
| 2010/0259596 A1* | 10/2010 | Park et al. | 348/43 |
| 2010/0289871 A1* | 11/2010 | Tatsuta et al. | 348/42 |
| 2010/0289872 A1* | 11/2010 | Funabiki et al. | 348/43 |
| 2011/0154161 A1* | 6/2011 | Kim et al. | 714/763 |
| 2014/0211884 A1* | 7/2014 | LEE et al. | 375/296 |

FOREIGN PATENT DOCUMENTS

| | | |
|---|---|---|
| JP | 10-257525 | 9/1998 |
| JP | 2005-6114 | 1/2005 |
| JP | 2006-352876 | 12/2006 |
| JP | 2006-352877 | 12/2006 |

OTHER PUBLICATIONS

International Search Report issued Mar. 30, 2010 in International (PCT) Application No. PCT/JP2009/007120.
WirelessHD Specification Version 1.0 Overview, Oct. 9, 2007.
High-Definition Multimedia Interface, Specification Version 1.4, Extraction of 3D Signaling Portion, HDMI Licensing LLC, Feb. 2, 2010.

* cited by examiner

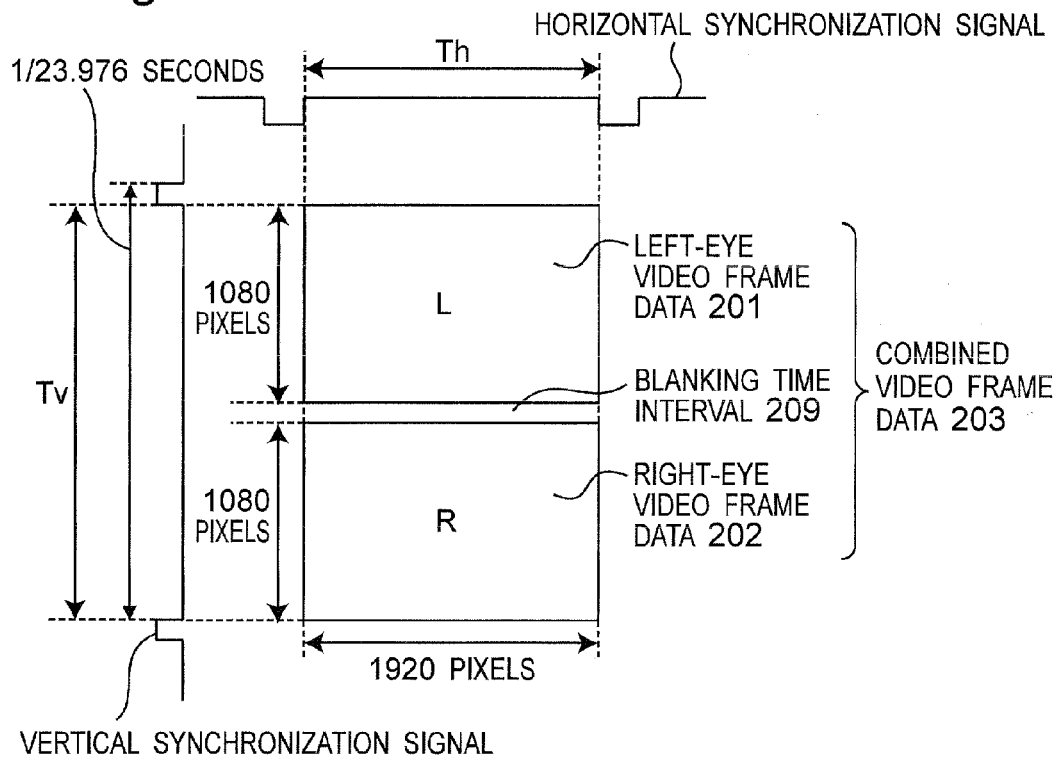
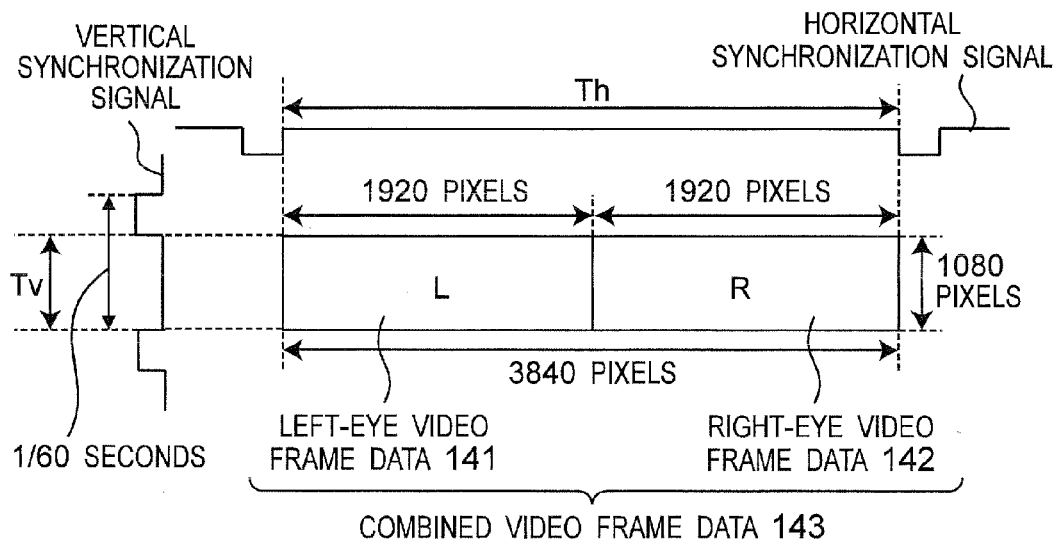

Fig.15

| VIDEO FORMAT IDENTIFICATION CODE (VIC) | FORMAT (OUTPUT SPECIFICATIONS) | FIELD RATE (Hz) | REMARKS |
|---|---|---|---|
| 1 | 640x480p | 59.94/60 | 2D |
| 2 | 720x480p | 59.94/60 | 2D |
| 3 | 1280x720p | 59.94/60 | 2D |
| 4 | 1920x1080i | 59.94/60 | 2D |
| 5 | 720(1440)x480i | 59.94/60 | 2D (PIXEL REPLICATION) |
| 6 | 720(1440)x240p | 59.94/60 | 2D (PIXEL REPLICATION) |
| 7 | 2880x480i | 59.94/60 | 2D (PIXEL REPLICATION) |
| 8 | 2880x240p | 59.94/60 | 2D (PIXEL REPLICATION) |
| 9 | 1440x480p | 59.94/60 | 2D (PIXEL REPLICATION) |
| 10 | 1920x1080p | 59.94/60 | 2D |
| 11 | 720x576p | 50 | 2D |
| 12 | 1280x720p | 50 | 2D |
| 13 | 1920x1080i | 50 | 2D |
| 14 | 720(1440)x576i | 50 | 2D (PIXEL REPLICATION) |
| 15 | 720(1440)x288p | 50 | 2D (PIXEL REPLICATION) |
| 16 | 2880x576i | 50 | 2D (PIXEL REPLICATION) |
| 17 | 2880x288p | 50 | 2D (PIXEL REPLICATION) |
| 18 | 1440x576p | 50 | 2D (PIXEL REPLICATION) |
| 19 | 1920x1080p | 50 | 2D |
| 20 | 1920x1080p | 23.97/24 | 2D |
| 21 | 1920x1080p | 25 | 2D |
| 22 | 1920x1080p | 29.97/30 | 2D |
| 23 | 2880x480p | 59.94/60 | 2D (PIXEL REPLICATION) |
| 24 | 2880x576p | 50 | 2D (PIXEL REPLICATION) |
| 25 | 1920x1080i(1250total) | 50 | 2D |
| 26 | 1920x1080i | 100 | 2D |
| 27 | 1280x720p | 100 | 2D |
| 28 | 720x576p | 100 | 2D |

Fig. 16

| VIDEO FORMAT IDENTIFICATION CODE (VIC) | FORMAT (OUTPUT SPECIFICATIONS) | FIELD RATE (Hz) | REMARKS |
|---|---|---|---|
| 29 | 720(1440)x576i | 100 | 2D (PIXEL REPLICATION) |
| 30 | 1920x1080i | 119.88/120 | 2D |
| 31 | 1280x720p | 119.88/120 | 2D |
| 32 | 720x480p | 119.88/120 | 2D |
| 33 | 720(1440)x480i | 119.88/120 | 2D (PIXEL REPLICATION) |
| 34 | 720X576p | 200 | 2D |
| 35 | 720(1440)x576i | 200 | 2D (PIXEL REPLICATION) |
| 36 | 720x480p | 239.76/240 | 2D |
| 37 | 720(1440)x480i | 239.76/240 | 2D (PIXEL REPLICATION) |
| 38 | 1920x1080p | 47.94/48 | 2D |
| 39 | 2560x1440p | 23.97/24 | 2D (QUAD HD) |
| 40 | 2560x1440p | 25 | 2D (QUAD HD) |
| 41 | 2560x1440p | 29.97/30 | 2D (QUAD HD) |
| 42 | 2560x1440p | 50 | 2D (QUAD HD) |
| 43 | 2560x1440p | 59.94/60 | 2D (QUAD HD) |
| 44 | 3840x2160p | 23.97/24 | 2D (QUAD FULL HD) |
| 45 | 3840x2160p | 25 | 2D (QUAD FULL HD) |
| 46 | 3840x2160p | 29.97/30 | 2D (QUAD FULL HD) |
| 47 | 4096x2160p | 23.97/24 | 2D (DIGITAL MOVIE) |
| 48 | 4096x2160p | 25 | 2D (DIGITAL MOVIE) |
| 49 | 1920x1080p | 100 | 2D |
| 50 | 1920x1080p | 119.88/120 | 2D |
| 51-95 | RESERVED | | |
| 96 | 1920x1080p | 23.97/24 | 3D (FRAME SEQUENTIAL) |
| 97 | 1920x1080p | 25 | 3D (FRAME SEQUENTIAL) |
| 98 | 1280x720p | 59.94/60 | 3D (FRAME SEQUENTIAL) |
| 99 | 1280x720p | 50 | 3D (FRAME SEQUENTIAL) |
| 100-127 | RESERVED | | |

SOURCE DEVICE, SINK DEVICE, COMMUNICATION SYSTEM AND METHOD FOR WIRELESSLY TRANSMITTING THREE-DIMENSIONAL VIDEO DATA USING PACKETS

TECHNICAL FIELD

The present invention relates to a packet transmitting method of video data, a source device for transmitting the video data, a sink device for receiving the video data, and a communication system including the source device and the sink device. In particular, the present invention relates to packet transmitting method of three-dimensional (also referred to as 3D or stereoscopic) video data including first and second video frame data such as right-eye video frame data and left-eye video frame data, a source device for transmitting the video data, a sink device for receiving the video data, and a communication system including the source device and the sink device.

BACKGROUND ART

There has been established a Wireless HD (See the Non-Patent Document 1) of a standard for wirelessly transmitting an uncompressed baseband video signal and a digital audio signal among audio and visual equipments (referred to as AV (Audio and Visual) equipments hereinafter). The wireless HD is technical specifications for watching high-definition video data stored in a source device such as a digital video recorder, a set-top box and a personal computer, by using a sink device such as a high-definition television without any cable connection between the source device and the sink device. In addition, since the specifications also include definitions of interactive control signals, it is possible to link the television with the digital video recorder, and it is possible to provide a home theater or the like by using a plurality of AV equipments so that the AV equipments are controlled all together. A protocol for these controls is defined in the specifications. In addition, since it is possible to transmit high-quality contents using the wireless HD, a DTCP (Digital Transmission Content Protection) is defined as a contents protection system so that the provided contents are not unrighteously reproduced or illegally copied.

FIG. 18 is a diagram showing a frame format of video data in the wireless HD according to the prior art. Referring to FIG. 18, each packet of the video data includes an HRP (High Rate Physical Layer) preamble 11, an HRP header 12, a MAC (Medium Access Control) header 13, an HCS (Header Check Sequence) 14, a packet body 15, and a beam tracking 16. In this case, the packet body 15, which can be divided into seven subpackets at maximum, is divided into four subpackets in FIG. 18. In addition, the MAC header 13 includes a video header 17 of 24 bytes, and the video header 17 includes four video controls 17a, 17b, 17c and 17d, and a video playback time 17e of four bytes. The four video controls 17a, 17b, 17c and 17d are provided so as to correspond to the respective subpackets, where each of the subpackets has a size of five bytes and is included in the packet body. Further, each of the video controls 17a, 17b, 17c and 17d includes a partition index 20 of 4 bits, an interlace field indication (also referred to as an interlace indication) 21 of one bit, a video frame number 22 of three bits, an H-position 23P of 16 bits and a V-position 24P of 16 bits.

In this case, the HRP preamble 11 is a synchronization pattern part located at the packet head to demodulate an HRP signal of a burst signal, the HRP header 12 is a header part to store control information on a Physical Layer of the wireless HD, the MAC header 13 is a header part to store control information on the MAC layer of the wireless HD, and the HCS 14 is an error detection part to store data for error detection of the HRP header 12 and the MAC header 13. The packet body 15 is a payload part (divided into seven subpackets at maximum) in which the video data is packed, and the beam tracking 16 is a control data part to store control data for making the beam direction of the HRP signal follow among devices. In addition, the video header 17 is a header part to store control information on the video data of the packet body 15.

Further, the video controls 17a, 17b, 17c and 17d are header parts to store format information of the respective video data stored in the four subpackets of the packet body 15, and the video playback time 17e stores reproduction information related to the video data of the packet body 15. In addition, the partition index 20 stores division information on the pixel data of the video data stored in the subpackets of the packet body 15, the interlace field indication 21 stores data for identifying the top and the bottom of an interlace signal related to the video data of the subpackets stored in the packet body 15, and the video frame number 22 stores the video frame number of the pixel data related to the video data of the subpackets stored in the packet body 15. The H-position 23P stores information on the horizontal position of the first pixel of the video data of the subpackets stored in the packet body 15, and the V-position 24P stores vertical position information on the first pixel of the video data stored in the subpackets of the packet body 15.

The packet transmitting method of the video data configured as described above is described below. First of all, the source device and the sink device are wirelessly connected with each other by using an LRP (Low Rate PHY) signal in the 60-GHz band. Then, uncompressed video data is transmitted using a time-division system from the source device to the sink device with an HRP (High Rate PHY) signal, which permits high-speed transmission of equal to or larger than 3 Gbps.

First of all, there will be described such a case where the format of the video data transmitted from the source device to the sink device is 1080p (1920 pixels in the horizontal direction/1080 lines in the vertical direction/progressive scan). In this case, as one example, it is assumed that the packet body 15 includes first to fourth subpackets, and video data of five lines in the vertical direction (i.e., video data of 5×1920=9600 pixels) are packed in each of the subpackets. In this case, the values to be stored in the interlace field indication 21, the video frame number 22, the H-position 23P and the V-position 24P in each of the video controls 17a, 17b, 17c and 17d provided so as to correspond to the respective subpackets are set as follows, and the video data is sequentially transmitted. It is noted that the numeric values starting from 0x represent hexadecimal numbers in the present specification.

First to Fourth Subpackets of First Packet:

First subpacket: interlace field indication 21=0b0, video frame number 22=0x0, H-position 23P=0x0000, V-position 24P=0x0000;

Second subpacket: interlace field indication 21=0b0, video frame number 22=0x0, H-position 23P=0x0000, V-position 24P=0x0005;

Third subpacket: interlace field indication 21=0b0, video frame number 22=0x0, H-position 23P=0x0000, V-position 24P=0x000a;

Fourth subpacket: interlace field indication 21=0b0, video frame number 22=0x0, H-position 23P=0x0000, V-position 24P=0x000f;

First to Fourth Subpackets of Second Packet:
First subpacket: interlace field indication 21=0b0, video frame number 22=0x0, H-position 23P=0x0000, V-position 24P=0x0014;
Second subpacket: interlace field indication 21=0b0, video frame number 22=0x0, H-position 23P=0x0000, V-position 24P=0x0019;
Third subpacket: interlace field indication 21=0b0, video frame number 22=0x0, H-position 23P=0x0000, V-position 24P=0x001e;
Fourth subpacket: interlace field indication 21=0b0, video frame number 22=0x0, H-position 23P=0x0000, V-position 24P=0x0023;
. . . ;
First to Fourth Subpackets of 54th Packet:
First subpacket: interlace field indication 21=0b0, video frame number 22=0x0, H-position 23P=0x0000, V-position 24P=0x0424;
Second subpacket: interlace field indication 21=0b0, video frame number 22=0x0, H-position 23P=0x0000, V-position 24P=0x0429;
Third subpacket: interlace field indication 21=0b0, video frame number 22=0x0, H-position 23P=0x0000, V-position 24P=0x042e;
Fourth subpacket: interlace field indication 21=0b0, video frame number 22=0x0, H-position 23P=0x0000, V-position 24P=0x0433
First to Fourth Subpackets of 55th Packet:
First subpacket: interlace field indication 21=0b0, video frame number 22=0x1, H-position 23P=0x0000, V-position 24P=0x0000;
Second subpacket: interlace field indication 21=0b0, video frame number 22=0x1, H-position 23P=0x0000, V-position 24P=0x0005;
Third subpacket: interlace field indication 21=0b0, video frame number 22=0x1, H-position 23P=0x0000, V-position 24P=0x000a;
Fourth subpacket: interlace field indication 21=0b0, video frame number 22=0x1, H-position 23P=0x0000, V-position 24P=0x000f;
. . . ;
First to Fourth Subpackets of 432nd Packet:
First subpacket: interlace field indication 21=0b0, video frame number 22=0x7, H-position 23P=0x0000, V-position 24P=0x0424;
Second subpacket: interlace field indication 21=0b0, video frame number 22=0x7, H-position 23P=0x0000, V-position 24P=0x0429;
Third subpacket: interlace field indication 21=0b0, video frame number 22=0x7, H-position 23P=0x0000, V-position 24P=0x042e;
Fourth subpacket: interlace field indication 21=0b0, video frame number 22=0x7, H-position 23P=0x0000, V-position 24P=0x0433;
First to Fourth Subpackets of 433rd Packet:
First subpacket: interlace field indication 21=0b0, video frame number 22=0x0, H-position 23P=0x0000, V-position 24P=0x0000;
Second subpacket: interlace field indication 21=0b0, video frame number 22=0x0, H-position 23P=0x0000, V-position 24P=0x0005;
Third subpacket: interlace field indication 21=0b0, video frame number 22=0x0, H-position 23P=0x0000, V-position 24P=0x000a;
Fourth subpacket: interlace field indication 21=0b0, video frame number 22=0x0, H-position 23P=0x0000, V-position 24P=0x000f; and sequences similar to above will subsequently follow.

In this case, it is assumed that 0b0 (unsupported) is stored in the partition index 20. In addition, it is assumed that there is no packet re-forwarding due to transmission errors.

Next, there will be described such a case where the format of the video data transmitted from the source device to the sink device is 1080i (1920 pixels in the horizontal direction/1080 lines in the vertical direction/interlace scan). In a manner similar to that of the above-described example, it is assumed that the packet body 15 includes first to fourth subpackets, and video data of five lines in the vertical direction (i.e., video data of 5×1920=9600 pixels) are packed in each of the subpackets. In this case, values stored in the interlace field indication 21, the video frame number 22, the H-position 23P and the V-position 24P in each of the video controls 17a, 17b, 17c and 17d provided so as to correspond to the respective subpackets are set as follows, and the video data is sequentially transmitted.

First to Fourth Subpackets of First Packet:
First subpacket: interlace field indication 21=0b0, video frame number 22=0x0, H-position 23P=0x0000, V-position 24P=0x0000;
Second subpacket: interlace field indication 21=0b0, video frame number 22=0x0, H-position 23P=0x0000, V-position 24P=0x0005;
Third subpacket: interlace field indication 21=0b0, video frame number 22=0x0, H-position 23P=0x0000, V-position 24P=0x000a;
Fourth subpacket: interlace field indication 21=0b0, video frame number 22=0x0, H-position 23P=0x0000, V-position 24P=0x000f;
First to Fourth Subpackets of Second Packet:
First subpacket: interlace field indication 21=0b0, video frame number 22=0x0, H-position 23P=0x0000, V-position 24P=0x0014;
Second subpacket: interlace field indication 21=0b0, video frame number 22=0x0, H-position 23P=0x0000, V-position 24P=0x0019;
Third subpacket: interlace field indication 21=0b0, video frame number 22=0x0, H-position 23P=0x0000, V-position 24P=0x001e;
Fourth subpacket: interlace field indication 21=0b0, video frame number 22=0x0, H-position 23P=0x0000, V-position 24P=0x0023;
. . . ;
First to Fourth Subpackets of 27th Packet:
First subpacket: interlace field indication 21=0b0, video frame number 22=0x0, H-position 23P=0x0000, V-position 24P=0x0208;
Second subpacket: interlace field indication 21=0b0, video frame number 22=0x0, H-position 23P=0x0000, V-position 24P=0x020d;
Third subpacket: interlace field indication 21=0b0, video frame number 22=0x0, H-position 23P=0x0000, V-position 24P=0x0212;
Fourth subpacket: interlace field indication 21=0b0, video frame number 22=0x0, H-position 23P=0x0000, V-position 24P=0x0217;
First to Fourth Subpackets of 28th Packet:
First subpacket: interlace field indication 21=0b1, video frame number 22=0x1, H-position 23P=0x0000, V-position 24P=0x0000;
Second subpacket: interlace field indication 21=0b1, video frame number 22=0x1, H-position 23P=0x0000, V-position 24P=0x0005;

Third subpacket: interlace field indication 21=0b1, video frame number 22=0x1, H-position 23P=0x0000, V-position 24P=0x000a;

Fourth subpacket: interlace field indication 21=0b1, video frame number 22=0x1, H-position 23P=0x0000, V-position 24P=0x000f;

. . . ;

First to Fourth Subpackets of 54th Packet:

First subpacket: interlace field indication 21=0b1, video frame number 22=0x1, H-position 23P=0x0000, V-position 24P=0x0208;

Second subpacket: interlace field indication 21=0b1, video frame number 22=0x1, H-position 23P=0x0000, V-position 24P=0x020d;

Third subpacket: interlace field indication 21=0b1, video frame number 22=0x1, H-position 23P=0x0000, V-position 24P=0x0212;

Fourth subpacket: interlace field indication 21=0b1, video frame number 22=0x1, H-position 23P=0x0000, V-position 24P=0x0217;

First to Fourth Subpackets of 55th Packet:

First subpacket: interlace field indication 21=0b0, video frame number 22=0x2, H-position 23P=0x0000, V-position 24P=0x0000;

Second subpacket: interlace field indication 21=0b0, video frame number 22=0x2, H-position 23P=0x0000, V-position 24P=0x0005;

Third subpacket: interlace field indication 21=0b0, video frame number 22=0x2, H-position 23P=0x0000, V-position 24P=0x000a;

Fourth subpacket: interlace field indication 21=0b0, video frame number 22=0x2, H-position 23P=0x0000, V-position 24P=0x000f;

. . . ;

First to Fourth Subpackets of 216th Packet:

First subpacket: interlace field indication 21=0b1, video frame number 22=0x7, H-position 23P=0x0000, V-position 24P=0x0208;

Second subpacket: interlace field indication 21=0b1, video frame number 22=0x7, H-position 23P=0x0000, V-position 24P=0x020d;

Third subpacket: interlace field indication 21=0b1, video frame number 22=0x7, H-position 23P=0x0000, V-position 24P=0x0212;

Fourth subpacket: interlace field indication 21=0b1, video frame number 22=0x7, H-position 23P=0x0000, V-position 24P=0x0217;

First to Fourth Subpackets of 217th Packet:

First subpacket: interlace field indication 21=0b0, video frame number 22=0x0, H-position 23P=0x0000, V-position 24P=0x0000;

Second subpacket: interlace field indication 21=0b0, video frame number 22=0x0, H-position 23P=0x0000, V-position 24P=0x0005;

Third subpacket: interlace field indication 21=0b0, video frame number 22=0x0, H-position 23P=0x0000, V-position 24P=0x000a;

Fourth subpacket: interlace field indication 21=0b0, video frame number 22=0x0, H-position 23P=0x0000, V-position 24P=0x000f; and sequences similar to above will subsequently follow.

In this case, it is assumed that the value 0b0 (unsupported) is stored in the partition index 20. In addition, it is assumed that there is no packet re-forwarding due to transmission errors.

By using the prior art video data packet format as described above, the uncompressed video data can be transmitted in real time from the source device to the sink device. The prior art wireless HD packet format is disclosed in the Patent Documents 1 to 3 the Non-Patent Document 1, for example.

CITATION LIST

Patent Document

Patent Document 1: United States Patent Application Publication No. 2008/0130741 A1;
Patent Document 2: United States Patent Application Publication No. 2008/0250294 A1;
Patent Document 3: United States Patent Application Publication No. 2007/0230461 A1;
Patent Document 4: United States Patent Application Publication No. 2002/0030675 A1;
Patent Document 5: United States Patent Application Publication No. 2005/0248802 A1;
Patent Document 6: Japanese Patent Laid-open Publication No. JP 2006-352876 A; and
Patent Document 7: Japanese Patent Laid-open Publication No. JP 2006-352877 A.

Non-Patent Document

Non-Patent Document 1: WirelessHD Specification Version 1.0 Overview, Oct. 9, 2007.

SUMMARY OF INVENTION

Technical Problem

However, in the video data packet format according to the prior art, the video header 17 includes the video controls 17a, 17b, 17c and 17d and the video playback time 17e, and each of the video controls 17a, 17b, 17c and 17d includes the partition index 20, the interlace field indication 21, the video frame number 22, the H-position 23P and the V-position 24P. In addition, it is assumed that the video data is two-dimensional (also referred to as 2D or flat) contents data (referred to as two-dimensional data hereinafter) including one frame data. Therefore, when the video data is three-dimensional contents data (referred to as three-dimensional data hereinafter) including first and second video frame data such as right-eye video frame data and left-eye video frame data, there has been such a problem that the left-eye video frame data and the right-eye video frame data cannot be identified in the source device and the sink device, and the video data cannot be transmitted.

In addition, each of the Patent Documents 4 to 7 discloses a transmitting method of the three-dimensional data, however, does not disclose any concrete configuration of packets when the three-dimensional data is transmitted using the packets.

It is an object of the present invention is to provide a video data packet transmitting method, a source device for transmitting the video data, a sink device for receiving the video data, and a communication system including the source device and the sink device each capable of solving the aforementioned problems, and capable of transmitting the three-dimensional data including the first and second video frame data such as the right-eye video frame data and the left-eye video frame data.

Solution to Problem

A source device according to a first invention is a source device for transmitting video data to a sink device by using a video frame of a predetermined packet format. The source device includes, first packet processing means for generating a plurality of packets, and transmitting means for transmitting a plurality of generated packets to the sink device. When the video data is three-dimensional data including first video frame data and second video frame data, the first packet processing means combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data.

In addition, in the above-described source device, the first packet processing means generates the combined video frame data for the horizontal display time interval of the video frame, so as to transmit the first video frame data of a predetermined number of lines for a first half of the vertical display time interval, and thereafter, transmit the second video frame data of the predetermined number of lines for a latter half of the vertical display time interval.

Further, in the above-described source device, the first packet processing means provides a predetermined blanking time interval between a transmission time interval for the first video frame data of the predetermined number of lines and a transmission time interval for the second video frame data of the predetermined number of lines.

Still further, the above-described source device further includes control means for inserting format information into a predetermined control command, and transmitting the control command to the sink device. The format information represents which one of (a) the three-dimensional data and (b) two-dimensional data including third video frame data the video data is.

In addition, the above-described source device further includes first storage means for previously storing a first video format identification code table including (a) video format identification codes for identifying a plurality of video formats of two-dimensional data including third video frame data and (b) 3D structures for identifying a plurality of video structures of the three-dimensional data, and control means for transmitting a video format identification code for identifying the video format of the video data and the 3D structure for identifying the video structure of the video data to the sink device with reference to the first video format identification code table.

Further, the above-described source device further includes first storage means for previously storing a first video format identification code table including video format identification codes for identifying (a) a plurality of video formats of two-dimensional data including third video frame data and (b) a plurality of video formats of the three-dimensional data, and control means for transmitting a video format identification code for identifying the video format of the video data to the sink device with reference to the first video format identification code table.

A sink device according to a second invention is a sink device for receiving video data from a source device, the source device transmitting the video data by using a video frame of a predetermined packet format. The source device includes first packet processing means for generating a plurality of packets, and transmitting means for transmitting a plurality of generated packets to the sink device. When the video data is three-dimensional data including first video frame data and second video frame data, the first packet processing means combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data. The sink device includes second packet processing means for receiving transmitted packets, and identifying the first video frame data and the second video frame data based on the information on the horizontal position and the information on the vertical position inserted into a plurality of received packets.

In addition, in the above-described sink device, the second packet processing means receives format information from the source device, and decodes a plurality of received packets according to received format information. The format information represents which one of (a) the three-dimensional data and (b) two-dimensional data including third video frame data the video data is.

Further, the above-described sink device further includes second storage means for previously storing a second video format identification code table including (a) video format identification codes for identifying a plurality of video formats of two-dimensional data including third video frame data and (b) 3D structures for identifying a plurality of video structures of the three-dimensional data. The second packet processing means receives a video format identification code for identifying the video format of the video data and the 3D structure for identifying the video structure of the video data from the source device, identifies the video format and the video structure with reference to the second video format identification code table based on received video format identification code and 3D structure, and decodes a plurality of received packets according to identified video format and video structure.

Still further, the above-described sink device further includes second storage means for previously storing a second video format identification code table including video format identification codes for identifying (a) a plurality of video formats of two-dimensional data including third video frame data and (b) a plurality of video formats of the three-dimensional data. The second packet processing means receives a video format identification code for identifying the video format of the video data from the source device, identifies the video format with reference to the second video format identification code table based on a received video format identification code, and decodes a plurality of received packets according to an identified video format.

A communication system according to a third invention includes the above-described source device and the above-described sink device.

A video data packet transmitting method according to the fourth invention is a video data packet transmitting method of transmitting video data from a source device to a sink device by using a video frame of a predetermined packet format. The video data packet transmitting method includes a first packet processing step of generating a plurality of packets by the source device, and a transmitting step of transmitting a plurality of generated packets to the sink device by the source device by the source device. When the video data is three-dimensional data including first video frame data and second video frame data, the first packet processing step combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data. The method further includes a second packet processing step of receiving transmitted packets, and identifying the first video frame data and the second video frame data based on the information on the horizontal position and the information on the vertical position inserted into a plurality of received packets by the sink device.

In addition, in the above-described video data packet transmitting method, the first packet processing step includes a step of generating the combined video frame data for the horizontal display time interval of the video frame, so as to transmit the first video frame data of a predetermined number of lines for a first half of the vertical display time interval, and thereafter, transmit the second video frame data of the predetermined number of lines for a latter half of the vertical display time interval.

Further, in the above-described video data packet transmitting method, the first packet processing step includes a step of providing a predetermined blanking time interval between a transmission time interval for the first video frame data of the predetermined number of lines and a transmission time interval for the second video frame data of the predetermined number of lines.

Still further, the above-described video data packet transmitting method further includes a control step of inserting format information into a predetermined control command, and transmitting the control command to the sink device by the source device. The format information represents which one of (a) the three-dimensional data and (b) two-dimensional data including third video frame data the video data is. The second packet processing step includes a step of receiving the format information from the source device, and decoding a plurality of received packets according to received format information.

In addition, the above-described video data packet transmitting method further includes a step of previously storing a first video format identification code table including (a) video format identification codes for identifying a plurality of video formats of two-dimensional data including third video frame data and (b) 3D structures for identifying a plurality of video structures of the three-dimensional data, in first storage means by the source device, a step of previously storing a second video format identification code table including the video format identification codes and the 3D structures in second storage means by the sink device, and a control step of transmitting a video format identification code for identifying the video format of the video data and the 3D structure for identifying the video structure of the video data to the sink device with reference to the first video format identification code table by the source device. The second packet processing step includes a step of receiving a video format identification code for identifying the video format of the video data and the 3D structure for identifying the video structure of the video data from the source device, identifying the video format and the video structure with reference to the second video format identification code table based on received video format identification code and 3D structure, and decoding a plurality of received packets according to identified video format and video structure.

Further, the above-described video data packet transmitting method further includes a step of previously storing a first video format identification code table including video format identification codes for identifying (a) a plurality of video formats of two-dimensional data including third video frame data and (b) a plurality of video formats of the three-dimensional data in first storage means by the source device, a step of previously storing a second video format identification code table including the video format identification codes in second storage means by the sink device, and a control step of transmitting a video format identification code for identifying the video format of the video data to the sink device with reference to the first video format identification code table by the source device. The second packet processing step includes a step of receiving a video format identification code for identifying the video format of the video data from the source device, identifying the video format with reference to the second video format identification code table based on a received video format identification code, and decoding a plurality of received packets according to an identified video format.

Advantageous Effects of Invention

According to the source device, the sink device, the communication system and the video data packet transmitting method of the present invention, when the video data is three-dimensional data including first video frame data and second video frame data, the source device combines the first video frame data with the second video frame data into combined video frame data every video frame, generates a plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data. The sink device receives transmitted packets, and identifies the first video frame data and the second video frame data based on the information on the horizontal position and the information on the vertical position inserted into a plurality of received packets. Therefore, it is possible to transmit the video data of the three-dimensional data in real time. In particular, it is possible to efficiently transmit AV contents data including the video data of two-dimensional data and the video data of three-dimensional data by using the packet format of the video data of the prior art wireless HD.

BRIEF DESCRIPTION OF DRAWINGS

FIG. 9 is a data configuration diagram of combined video frame data 203 according to a fifth preferred embodiment of the present invention, where the diagram is shown based on a relation between the horizontal synchronization signal and the vertical synchronization signal;

FIG. 10 is a data configuration diagram of combined video frame data 143 according to a sixth preferred embodiment of the present invention, where the diagram is shown based on a relation between the horizontal synchronization signal and the vertical synchronization signal;

FIG. 15 is a table showing the first part of VIC tables 115$t$ and 127$t$ of the tenth preferred embodiment of the present invention;

FIG. 16 is a table showing the second part of the VIC tables 115$t$ and 127$t$ of the tenth preferred embodiment of the present invention;

DESCRIPTION OF EMBODIMENTS

Figure 1:
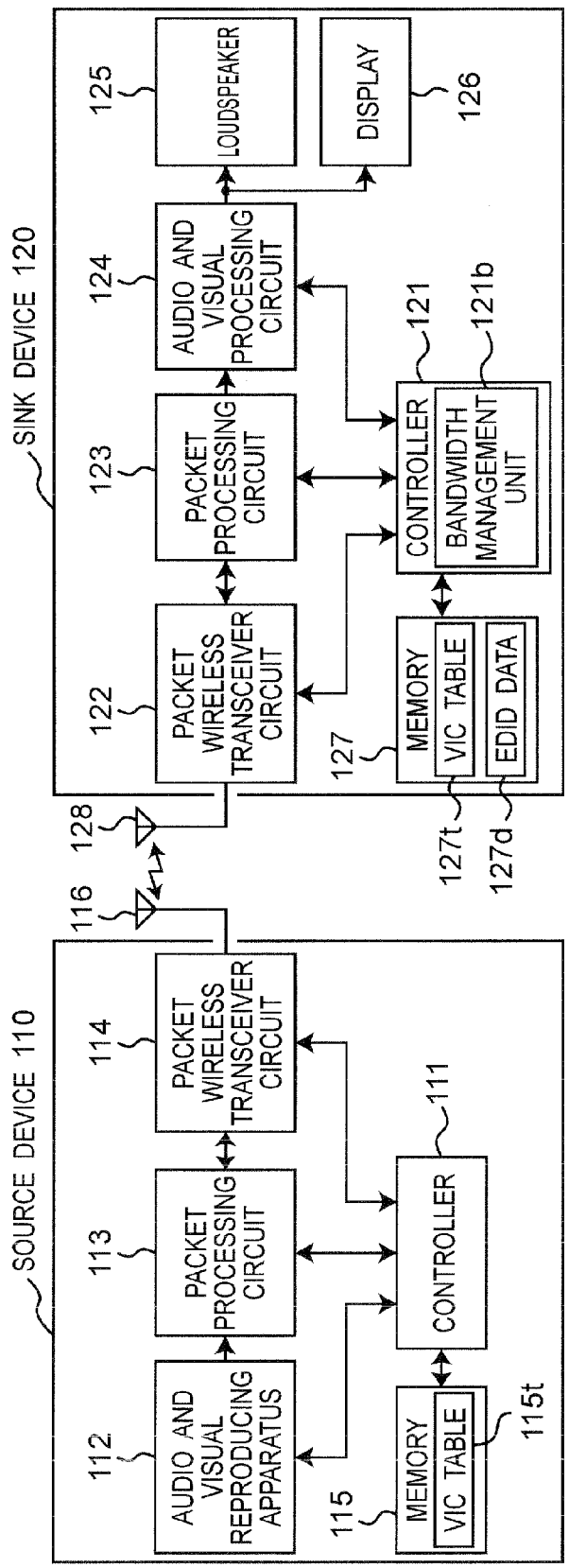
FIG. 1 is a block diagram showing a configuration of a wireless communication system for transmitting video data by using a video data packet transmitting method according to a first preferred embodiment of the present invention.

Preferred embodiments according to the present invention will be described below with reference to the attached drawings. In the following preferred embodiments, components similar to each other are denoted by the same reference numerals.

First Preferred Embodiment

Figure 2:
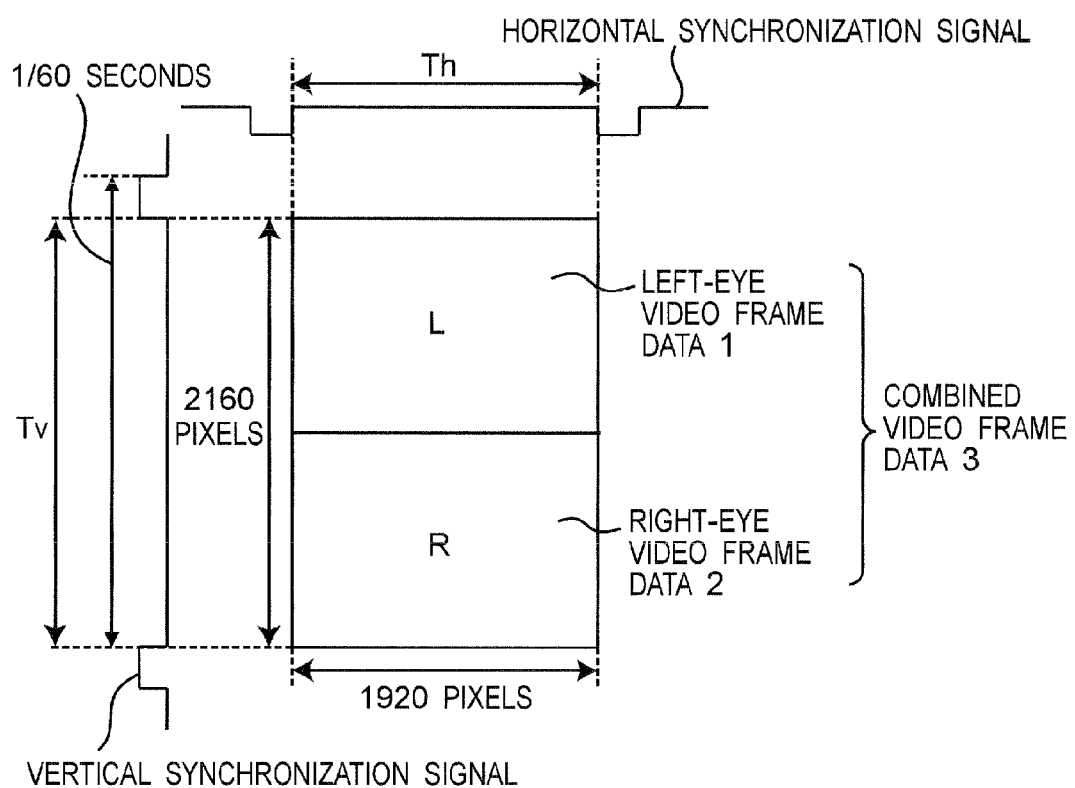
FIG. 2 is a data configuration diagram of combined video frame data 3 as described based on a relation between a horizontal synchronization signal and a vertical synchronization signal, where the combined video frame data 3 is transmitted in the wireless communication system of FIG. 1.
Figure 3:
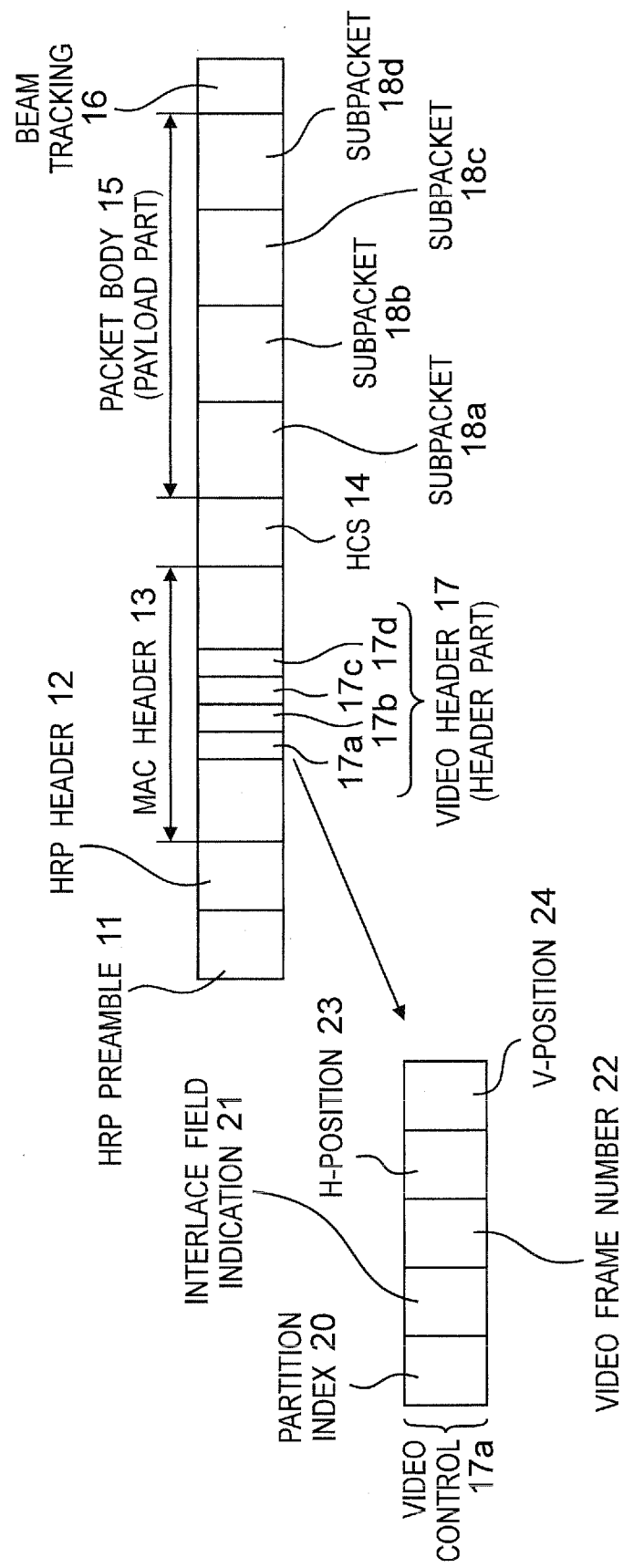
FIG. 3 is a diagram showing a frame format of the video data used in the wireless communication system of FIG. 1.
Figure 4:
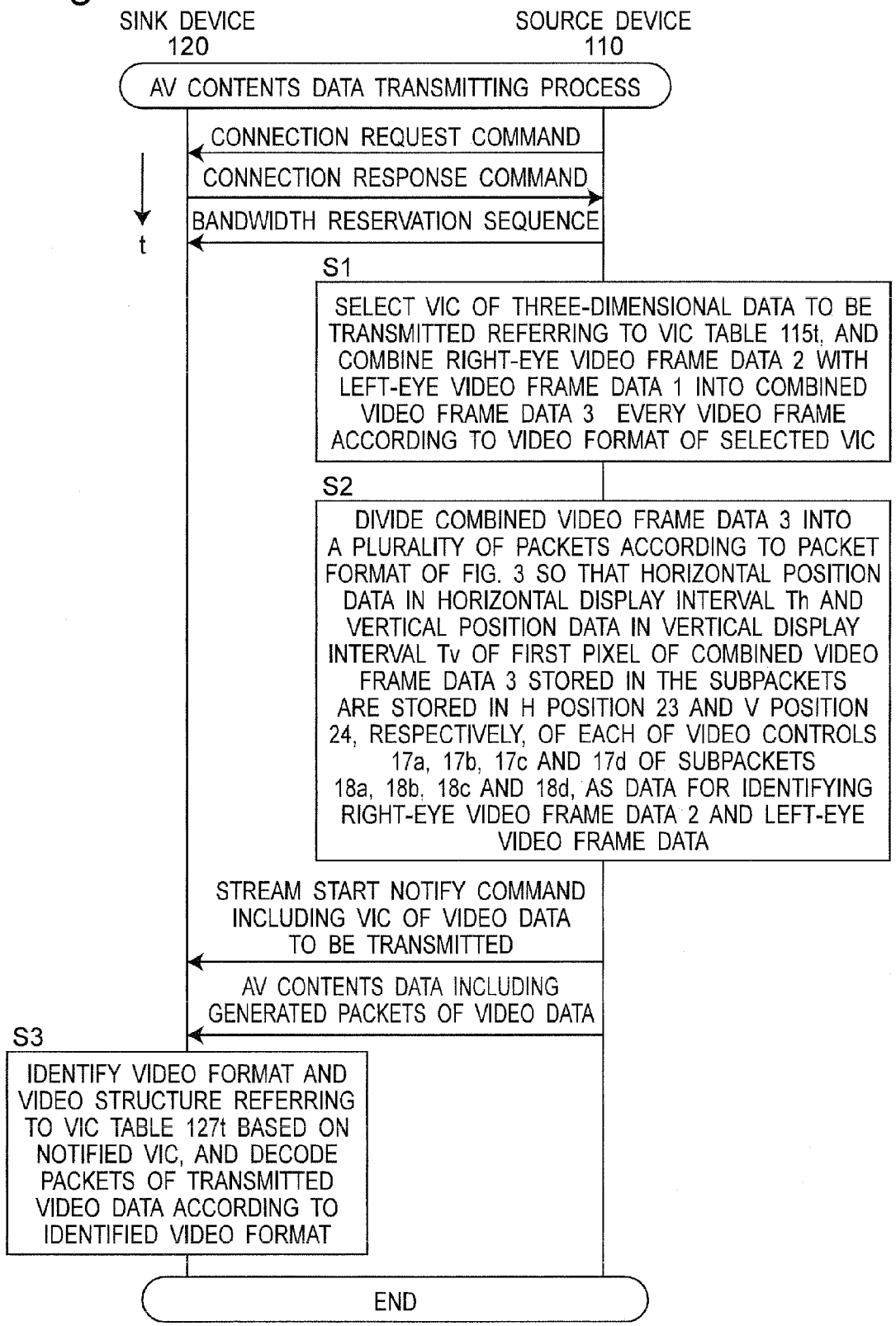
FIG. 4 is a sequence diagram showing an AV contents data transmitting process executed by the wireless communication system of FIG. 1.

FIG. 1 is a block diagram showing a configuration of a wireless communication system for transmitting video data by using a video data packet transmitting method according to the first preferred embodiment of the present invention. In addition, FIG. 2 is a data configuration diagram of combined video frame data 3 as described based on a relation between a horizontal synchronization signal and a vertical synchronization signal, where the combined video frame data 3 is transmitted in the wireless communication system of FIG. 1, and FIG. 3 is a diagram showing a frame format of the video data used in the wireless communication system of FIG. 1. Further, FIG. 4 is a sequence diagram showing an AV contents data transmitting process executed by the wireless communication system of FIG. 1. It is noted that configurations of a source device 110 and a sink device 120 of FIG. 1, and the AV contents data transmitting process of FIG. 4 are applied to the following first to fourth, tenth and eleventh preferred embodiments.

As described in detail later, the wireless communication system of the present preferred embodiment transmits the video data from the source device 110 to the sink device 120 by using a video frame of a predetermined packet format. In this case, the source device 1 is characterized by including a packet processing circuit 113 for generating a plurality of packets, and a packet wireless transceiver circuit 114 for transmitting a plurality of generated packets to the sink device 120. When the video data is three-dimensional data including left-eye video frame data 1 and right-eye video frame data 2, the packet processing circuit 113 combines the left-eye video frame data 1 with the right-eye video frame data 2 into combined video frame data 3 every video frame, and generates the plurality of packets by dividing the combined video frame data 3 into the plurality of packets according to the packet format so as to insert information on a horizontal position for a horizontal display time interval Th and information on a vertical position for a vertical display time interval Tv of the first pixel of the combined video frame data 3 stored in the packets, into a header of each packet for transmitting the combined video frame data 3, as data for identifying the left-eye video frame data 1 and the right-eye video frame data 2. In addition, the sink device 120 is characterized by including a packet processing circuit 123 for receiving transmitted packets, and identifying the left-eye video frame data 1 and the right-eye video frame data 2 based on the information on the horizontal position and the information on the vertical position inserted into a plurality of received packets.

Further, the source device 110 is characterized by including a memory 115 for previously storing a VIC table 115$t$ including video codes or Video Format Identification Codes (referred to as VICs hereinafter) for identifying a plurality of video formats of two-dimensional data and a plurality of video formats of three-dimensional data, and a controller 111 for transmitting the VIC for identifying the video formats of the video data to the sink device 120 with reference to the VIC table 115$t$.

In addition, the sink device 120 is characterized by further including a memory 127 for previously storing a VIC table 127$t$ including the VICs. The packet processing circuit 123 is characterized by receiving the VIC for identifying the video format of the video data from the source device 110, identifying the video format with reference to the VIC table 127$t$ based on a received VIC, and decoding a plurality of received packets according to an identified video format.

In addition, the packet processing circuit 113 is characterized by generating the combined video frame data 3 for the horizontal display time interval Th of the video frame, so as to transmit the left-eye video frame data 1 of 1080 lines for a first half of the vertical display time interval Tv, and thereafter, transmit the right-eye video frame data 2 of 1080 lines for a latter half of the vertical display time interval Tv.

Referring to FIG. 1, the wireless communication system of the present preferred embodiment complies with the wireless HD. The source device 110, which functions as a source device of AV contents data, is configured to include an audio and visual reproducing apparatus 112, the packet processing circuit 113, the packet wireless transceiver circuit 114 provided with an antenna 116, the memory 115 that previously stores the VIC table 115t, and the controller 111 that controls operations of these apparatuses and circuits 112 to 115. The audio and visual reproducing apparatus 112 is, for example, a DVD player, which reproduces video data and audio data from an external storage apparatus or recording media such as MD or DVD, and outputs the video data and audio data to the packet processing circuit 113. The packet processing circuit 113 converts inputted video data and audio data into a digital signal in a predetermined packet form as described in detail later, and outputs the digital signal to the packet wireless transceiver circuit 114. The packet wireless transceiver circuit 114 digitally modulates a carrier signal according to an inputted digital signal, and transmits a modulated wireless signal to a packet wireless transceiver circuit 122 of the sink device 120 via the antenna 116. On the other hand, a wireless signal wirelessly transmitted from the sink device 120 is received by the packet wireless transceiver circuit 114 via the antenna 116. The packet wireless transceiver circuit 114 demodulates a received wireless signal into a baseband signal, and thereafter, outputs the baseband signal to the packet processing circuit 113. The packet processing circuit 113 extracts only predetermined control commands by a predetermined packet separating process from an inputted baseband signal, and thereafter, outputs the predetermined commands to the controller 111.

In addition, the sink device 120 is configured to include the packet wireless transceiver circuit 122 provided with an antenna 128, the packet processing circuit 123, an audio and visual processing circuit 124, a loudspeaker 125, a display 126 that displays two-dimensional data and three-dimensional data, the memory 127 that previously stores EDID (Extended Display Identification Data) data 127d and the VIC table 127t, and a controller 121 that controls the operations of these circuits 122 to 124 and 127 and so on. In addition, the controller 121 is configured to include a bandwidth management unit 121b which manages bandwidths used by a wireless network and timing control for signal transmission. The packet wireless transceiver circuit 122 demodulates the wireless signal received via the antenna 128 into a baseband signal, and thereafter, outputs the baseband signal to the packet processing circuit 123. The packet processing circuit 123 decodes received packet by extracting only the video data, the audio data and the predetermined control commands from an inputted digital signal by a predetermined packet separating process, outputs the video data and the audio data to the audio and visual processing circuit 124, and outputs the control commands to the controller 121. The audio and visual processing circuit 124 executes predetermined signal processing and a D/A conversion process on inputted audio data, and thereafter, outputs processed audio data to the loudspeaker 125 so as to output sound. In addition, the audio and visual processing circuit 124 executes a predetermined signal processing and a D/A conversion processing on inputted video data, and outputs processed video data to the display 126 so as to display video.

Referring to FIG. 1, each of the VIC tables 115t and 127t includes VICs for identifying a plurality of video formats of two-dimensional data and a plurality of video formats of three-dimensional data. In this case, each video format represents output specifications of the video data in the sink device 120, and includes respective information on a number of vertical active pixels, a number of a horizontal active pixels, a scanning method (progressive scanning (p) or interlaced scanning (i)), and a vertical synchronizing frequency (also referred to as a field rate hereinafter) of the video data. In the present preferred embodiment, the VICs of 1 to 37 and 128 to 136 are allocated to the video format of the respective video formats of the two-dimensional data, and the VICs of 64 to 72 are allocated to the respective video formats of the three-dimensional data. In addition, the EDID data 127d includes data such as respective VICs of video data, which can be displayed on the display 126 and are included in the VIC table 127t, product information and a manufacturer name of the display 126, a video coding method (such as RGB, $YC_BC_R$ 4:4:4 or $YC_BC_R$ 4:2:2), and audio output specification (referred to as audio format hereinafter) such as sound output sampling.

Referring to FIG. 1, the controller 111 selects a VIC of the three-dimensional data with reference to the VIC table 115t when transmitting the three-dimensional data to the sink device 120, and controls the packet processing circuit 113 to combine the left-eye video frame data 1 and the right-eye video frame data 2 included in the three-dimensional data into the combined video frame data 3 every video frame based on a selected VIC.

FIG. 2 shows the data configuration of the combined video frame data 3 when the VIC is 66, where the diagram is shown based on the relation between the horizontal synchronization signal and the vertical synchronization signal. Referring to FIG. 2, the horizontal display time interval Th includes a time interval provided between a horizontal synchronization interval and a next horizontal synchronization interval of the horizontal synchronization signal, and the vertical display time interval Tv includes a time interval between a vertical synchronization interval and a next vertical synchronization interval of the vertical synchronization signal. Referring to FIG. 2, each of the left-eye video frame data 1 and the right-eye video frame data 2 has the number of horizontal active pixels of 1920 pixels and the number of vertical active pixels of 1080 pixels. In addition, the combined video frame data 3 has the number of horizontal pixels of 1920 pixels and the number of vertical pixels of 2160 pixels. Further, the vertical synchronization frequency of the left-eye video frame data 1 and the right-eye video frame data 2 is 60 Hz. The packet processing circuit 113 combines the left-eye video frame data 1 with the right-eye video frame data 2 into the combined video frame data 3. In this case, the combined video frame data 3 is generated for the horizontal display time interval Th so that the left-eye video frame data 1 of 1080 lines is transmitted for the first half of the vertical display time interval Tv, and thereafter, the right-eye video frame data 2 of 1080 lines is transmitted for the latter half of vertical display time interval Tv.

Further, referring to FIG. 1, when transmitting the three-dimensional data, the packet processing circuit 113 generates the combined video frame data 3, and divides the combined video frame data 3 into a plurality of packets according to the packet format of FIG. 3. On the other hand, when transmitting the two-dimensional data, the packet processing circuit 113 generates video frame data of two-dimensional data, and divides generated video frame data into a plurality of packets of the two-dimensional data according to the packet format of FIG. 3. In this case, referring to FIG. 3, an HRP preamble 11 is a synchronization pattern part for storing a synchronization pattern located at the packet head to demodulate an HRP signal of a burst signal, an HRP header 12 is a header part for storing control information on the physical layer of the wireless HD, and a MAC header 13 is a header part for storing control information on the MAC layer of the wireless HD. An HCS 14 is an error detection part for storing data for error detection of the HRP header 12 and the MAC header 13, the packet body 15 is a payload part in which the video data of the combined video frame data 3 or the video frame data of the two-dimensional data is packed, and a beam tracking 16 is a control data part for storing control data for making the beam direction of the HRP signal follow among devices. The packet body 15 is divided into seven subpackets at maximum, and the packet body 15 is divided into four subpackets 18a to 18d in the present preferred embodiment. In addition, the MAC header 13 includes a video header 17. The video header 17 is a header part, which includes video controls 17a to 17d for storing format information related to the video data stored in the subpackets 18a to 18d, respectively.

Referring to FIG. 3, the video control 17a includes a partition index 20, an interlace field indication 21, a video frame number 22, an H-position 23, and a V-position 24. In this case, in the video control 17a, the partition index 20 stores division information on the video data (pixel data) stored in the subpacket 18a, the interlace field indication 21 stores data to identify the top and the bottom of the interlace signal related to the video data stored in the subpacket 18a, and the video frame number 22 stores the video frame number of the video data stored in the subpacket 18a. Further, each of the video controls 17b, 17c and 17d includes a partition index 20, an interlace field indication 21, a video frame number 22, an H-position 23 and a V-position 24 in a manner similar to that of the video control 17a.

Figure 18:
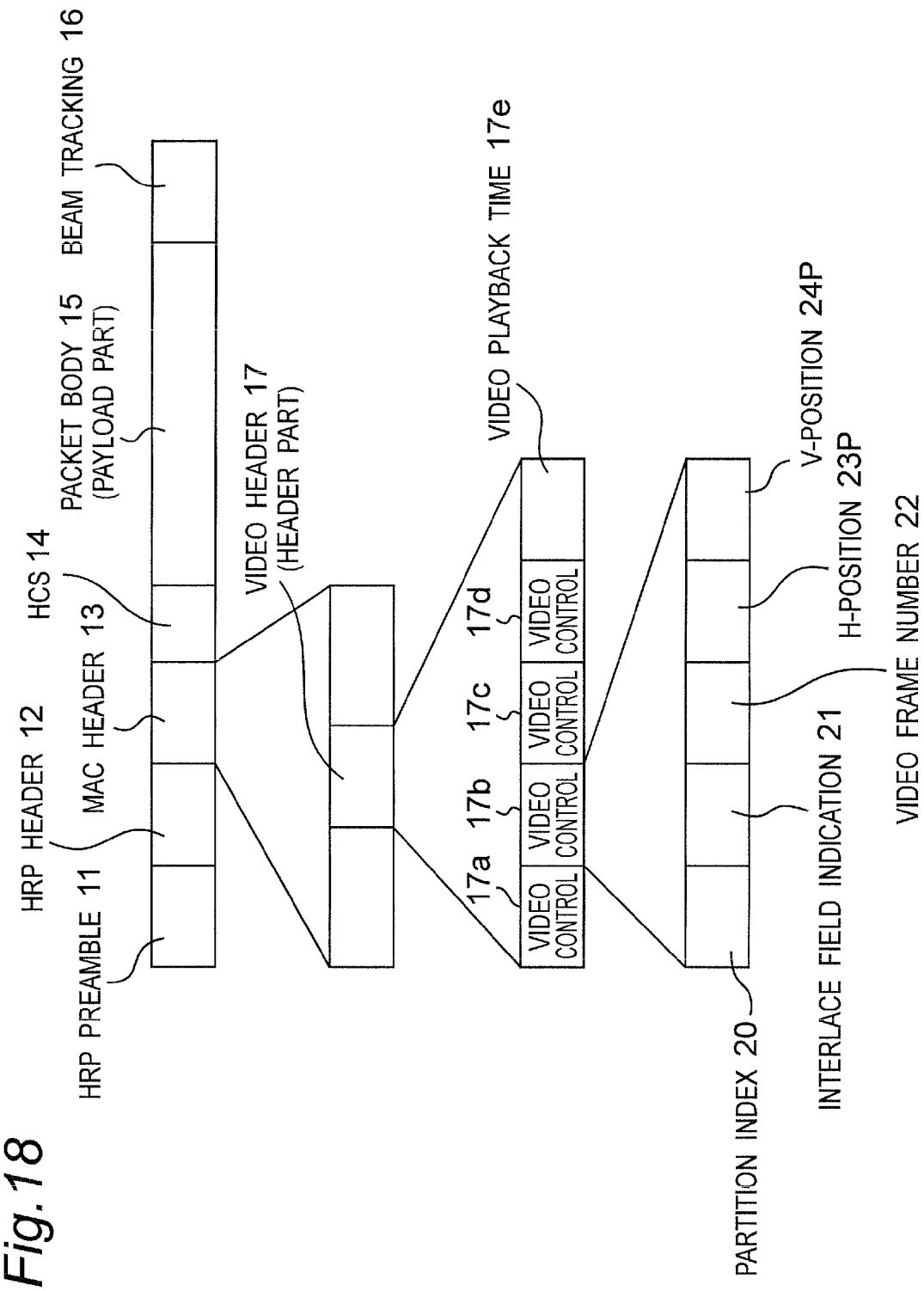
FIG. 18 is a diagram showing a frame format of video data in a wireless HD according to a prior art.

Referring to FIG. 3, when the video frame data of the two-dimensional data is stored in the subpacket 18a, the H-position 23 stores a horizontal position data for the horizontal display time interval Th of the first pixel of the video frame data stored in the subpacket 18a in a manner similar to that of the H-position 23P of the prior art video data packet format of FIG. 18, and the V-position 24 stores a vertical position data for the vertical display time interval Tv of the first pixel of the video frame data stored in the subpacket 18a in a manner similar to that of the V-position 24P of the prior art video data packet format of FIG. 18. In addition, when the combined video frame data 3 is stored in the subpacket 18a, the H-position 23 and the V-position 24 store the horizontal position data for the horizontal display time interval Th and the vertical position data for the vertical display time interval Tv, respectively, of the first pixel of the combined video frame data 3 stored in the subpacket 18a as data for identifying the left-eye video frame data 1 and the right-eye video frame data. Concretely speaking, when the left-eye video frame data 1 is transmitted, the value stored in the H-position 23 is set to a value of 0x0000 to 0x077F (0 to 1919), and the value stored in the V-position 24 is set to a value of 0x0000 to 0x0437 (0 to 1079). On the other hand, when the right-eye video frame data 2 is transmitted, the value stored in the H-position 23 is set to a value of 0x0000 to 0x077F (0 to 1919), and the value stored in the V-position 24 is set to a value of 0x0438 to 0x086F (1080 to 2159). It is noted that the values stored in the video frame numbers 22 corresponding to the left-eye video frame data 1 and the right-eye video frame data 2 in the same frame are set to be the same as each other.

Next, the packet transmitting method of the AV contents data including three-dimensional data from the source device 110 to the sink device is described with reference to FIG. 4. Although the subjects of the operations of the source device 110 and the sink device 120 are the controllers 111 and 121, no description is hereinafter provided therefor. First of all, the source device 110 wirelessly transmits a connection request (CONNECT_REQUEST) command to request a wireless connection to the sink device 120. In response to this, the sink device 120 transmits a connection response (CONNECT_RESPONSE) command to the source device 110. By this operation, the sink device 120 is registered in the source device 110 as the other party for the communication, and the source device 110 is registered in the sink device 120 as the other party for the communication. Next, a bandwidth reservation sequence, which is compliant with the wireless HD and is executed for securing a transmission bandwidth for transmitting the AV contents data including the video data and the audio data from the source device 110 to the sink device 120, is executed between the source device 110 and the sink device 120. In the bandwidth reservation sequence, the source device 110 wirelessly transmits a bandwidth request command to the sink device 120 in order to request and reserve the bandwidth for transmitting the AV contents data. In response to this, the bandwidth management unit 121b of the sink device 120 allocates a reservation time period required for transmitting the AV contents data from the source device 110 to the sink device 120, and wirelessly transmits a time period designation command including information on an allocated reservation time period to the source device 110.

On the other hand, subsequent to the bandwidth reservation sequence, in step S1, the controller 111 of the source device 110 selects the VIC, which is the format information of the three-dimensional data to be transmitted, with reference to the VIC table 115t. Then, the controller 111 controls the packet processing circuit 113 to combine the right-eye video frame data 2 and the left-eye video frame data 1 into the combined video frame data 3 every video frame according to the video format of the selected VIC. Further, in step S2, the controller 111 of the source device 110 controls the packet processing circuit 113 to divide the combined video frame data 3 into a plurality of packets according to the packet format of FIG. 3. In response to this, the packet processing circuit 113 divides the combined video frame data 3 into a plurality of packets according to the packet format of FIG. 3 so that the horizontal position data for the horizontal display time interval Th and the vertical position data for the vertical display time interval Tv of the first pixel of the combined video frame data 3 stored in the subpackets are stored in the H-position 23 and the V-position 24 of each of the video controls 17a, 17b, 17c and 17d of the subpackets 18a, 18b, 18c and 18d as data for identifying the right-eye video frame data 2 and the left-eye video frame data 1.

Next, the source device 110 inserts the selected VIC into a stream start notification (STREAM_START_NOTIFY) command to inform the sink device 120 of the selected VIC, and wirelessly transmits the AV contents data including the plurality of generated packets to the sink device 120 for the allocated reservation time period. In step S3, the sink device 120 identifies the video format with reference to the VIC table 127t based on the notified VIC, and controls the packet processing circuit 123 to decode the packets of the transmitted video data according to the identified video format. In this case, the packet processing circuit 123 identifies the right-eye video frame data 2 and the left-eye video frame data 1 based on each horizontal position data stored in the H-position 23 and each vertical position data stored in the V-position 24 of each packet of the received video data.

It is noted that the source device 110 divides the audio data into a plurality of audio packets according to the audio packet format compliant with the wireless HD in step S2, and wirelessly transmits the packets to the sink device 120 with the plurality of packets of the combined video frame data 3. In addition, in the source device 110, when the video data is the two-dimensional data, the packet processing circuit 113 generates video frame data according to the video format of the selected VIC every video frame, and generates a plurality of packets by dividing the generated video frame data into a plurality of packets according to the packet format of FIG. 3.

Next, there will be described a concrete example of values to be stored in the interlace field indication 21, the video frame number 22, the H-position 23 and the V-position 24 when the combined video frame data 3 of FIG. 2 is transmitted. In this case, as one example, it is assumed that the packet body 15 includes the subpacket 18a to the subpacket 18d, and video data of five lines in the vertical direction (i.e., video data of 5×1920=9600 pixels) are packed into each of the subpackets. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f;

Subpackets 18a to 18d of Second Packet:
Subpacket 18a: interlace field indication 21=0b0, video frame number 22=0x0, H-position 23=0x0000, V-position 24=0x0014;
Subpacket 18b: interlace field indication 21=0b0, video frame number 22=0x0, H-position 23=0x0000, V-position 24=0x0019;
Subpacket 18c: interlace field indication 21=0b0, video frame number 22=0x0, H-position 23=0x0000, V-position 24=0x001e;
Subpacket 18d: interlace field indication 21=0b0, video frame number 22=0x0, H-position 23=0x0000, V-position 24=0x0023;
. . . ;

Subpackets 18a to 18d of 108th Packet:
Subpacket 18a: interlace field indication 21=0b0, video frame number 22=0x0, H-position 23=0x0000, V-position 24=0x085c;
Subpacket 18b: interlace field indication 21=0b0, video frame number 22=0x0, H-position 23=0x0000, V-position 24=0x0861;
Subpacket 18c: interlace field indication 21=0b0, video frame number 22=0x0, H-position 23=0x0000, V-position 24=0x0866;
Subpacket 18d: interlace field indication 21=0b0, video frame number 22=0x0, H-position 23=0x0000, V-position 24=0x086b;

Subpackets 18a to 18d of 109th Packet:
Subpacket 18a: interlace field indication 21=0b0, video frame number 22=0x1, H-position 23=0x0000, V-position 24=0x0000;
Subpacket 18b: interlace field indication 21=0b0, video frame number 22=0x1, H-position 23=0x0000, V-position 24=0x0005;
Subpacket 18c: interlace field indication 21=0b0, video frame number 22=0x1, H-position 23=0x0000, V-position 24=0x000a;
Subpacket 18d: interlace field indication 21=0b0, video frame number 22=0x1, H-position 23=0x0000, V-position 24=0x000f;
. . . ;

Subpackets 18a to 18d of 864th Packet:
Subpacket 18a: interlace field indication 21=0b0, video frame number 22=0x7, H-position 23=0x0000, V-position 24=0x085c;
Subpacket 18b: interlace field indication 21=0b0, video frame number 22=0x7, H-position 23=0x0000, V-position 24=0x0861;
Subpacket 18c: interlace field indication 21=0b0, video frame number 22=0x7, H-position 23=0x0000, V-position 24=0x0866;
Subpacket 18d: interlace field indication 21=0b0, video frame number 22=0x7, H-position 23=0x0000, V-position 24=0x086b;

Subpackets 18a to 10d of 865th Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f;

and sequences similar to above will subsequently follow.

In this case, it is assumed that 0b0 (unsupported) is stored in the partition index 20. In addition, it is assumed that there is no packet re-forwarding due to transmission errors.

As described above, the left-eye video frame data 1 of the first frame is transmitted in a form of packet in the first to 54th packets, the right-eye video frame data 2 of the first frame is transmitted in a form of packet in the 55th to 108th packets, and the combined video frame data 3 is subsequently transmitted in a form of packet by using 108 packets every video frame in a manner similar to above.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position data for the vertical display time interval Tv of the combined video frame data 3, which is obtained by combining the left-eye video frame data 1 with the right-eye video frame data 2, are stored in the H-position 23 and the V-position 24, respectively, as the data for identifying the left-eye video frame data 1 and the right-eye video frame data 2. Therefore, it is possible to identify the left-eye video frame data 1 and the right-eye video frame data 2 that are transmitted in a form of packet, and to efficiently transmit the AV contents data including the two-dimensional video data and the AV contents including the three-dimensional video data in the same packet format.

Second Preferred Embodiment

Figure 5:
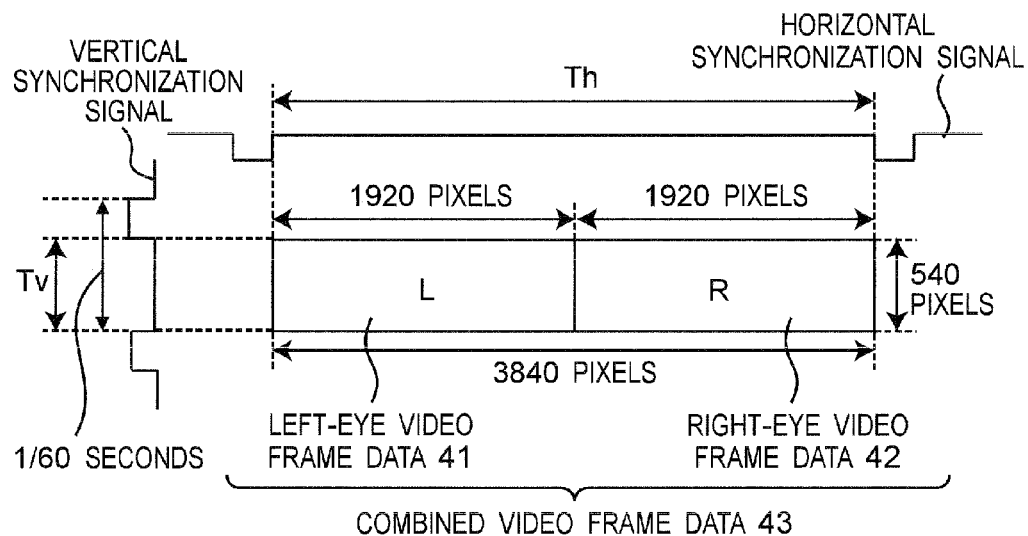
FIG. 5 is a data configuration diagram of combined video frame data 43 according to a second preferred embodiment of the present invention, where the diagram is shown based on a relation between the horizontal synchronization signal and the vertical synchronization signal.

FIG. 5 is a data configuration diagram of combined video frame data 43 according to a second preferred embodiment of the present invention, where the diagram is shown based on a relation between the horizontal synchronization signal and the vertical synchronization signal. The present preferred embodiment is different from the first preferred embodiment only in the generating method of the combined video frame data 43. The other points are similar to those of the first preferred embodiment, and therefore, no description of the operation is herein provided therefor.

FIG. 5 shows the format of the combined video frame data 43 when the VIC is 69. Referring to FIG. 5, each of the left-eye video frame data 41 and the right-eye video frame data 42 has the number of horizontal active pixels of 1920 pixels and the number of vertical active pixels of 540 pixels. In addition, the combined video frame data 43 has the number of horizontal pixels of 3840 pixels and the number of vertical pixels of 540 pixels. Further, the vertical synchronization frequency of the left-eye video frame data 41 and the right-eye video frame data 42 is 60 Hz. The packet processing circuit 113 combines the left-eye video frame data 41 with the right-eye video frame data 42 into the combined video frame data 43. In this case, the combined video frame data 43 is generated for the vertical display time interval Tv so that the left-eye video frame data 41 of 1920 pixels is transmitted for the first half of the horizontal display time interval Th, and thereafter, the right-eye video frame data 42 of 1920 pixels is transmitted for the latter half of the horizontal display time interval Th.

The source device 110 divides the combined video frame data 43 into a plurality of packets according to the packet format of FIG. 3, and wirelessly transmits the packets to the sink device 120. In this case, when the left-eye video frame data 41 is transmitted, the value stored in the H-position 23 is set to a value of 0x0000 to 0x077F (0 to 1919), and the value stored in the V-position 24 is set to a value of 0x0000 to 0x021B (0 to 539). On the other hand, when the right-eye video frame data 42 is transmitted, the value stored in the H-position 23 is set to a value of 0x0780 to 0x0EFF (1920 to 3839), and the value stored in the V-position 24 is set to a value of 0x0000 to 0x021B (0 to 539). It is noted that the values stored in the video frame numbers 22 corresponding to the left-eye video frame data 41 and the right-eye video frame data 42 in the same frame are set to be the same as each other.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0780, V-position 24=0x0002;
Subpacket 18c: interlace field indication 21=0b0, video frame number 22=0x0, H-position 23=0x0000, V-position 24=0x0005;
Subpacket 18d: interlace field indication 21=0b0, video frame number 22=0x0, H-position 23=0x0780, V-position 24=0x0007;

Subpackets 18a to 18d of Second Packet:
Subpacket 18a: interlace field indication 21=0b0, video frame number 22=0x0, H-position 23=0x0000, V-position 24=0x000a;
Subpacket 18b: interlace field indication 21=0b0, video frame number 22=0x0, H-position 23=0x0780, V-position 24=0x000c;
Subpacket 18c: interlace field indication 21=0b0, video frame number 22=0x0, H-position 23=0x0000, V-position 24=0x000f;
Subpacket 18d: interlace field indication 21=0b0, video frame number 22=0x0, H-position 23=0x0780, V-position 24=0x0011;
. . . ;

Subpackets 18a to 18d of 54th Packet:
Subpacket 18a: interlace field indication 21=0b0, video frame number 22=0x0, H-position 23=0x0000, V-position 24=0x0212;
Subpacket 18b: interlace field indication 21=0b0, video frame number 22=0x0, H-position 23=0x0780, V-position 24=0x0214;
Subpacket 18c: interlace field indication 21=0b0, video frame number 22=0x0, H-position 23=0x0000, V-position 24=0x0217;
Subpacket 18d: interlace field indication 21=0b0, video frame number 22=0x0, H-position 23=0x0780, V-position 24=0x0219;

Subpackets 18a to 18d of 55th Packet:
Subpacket 18a: interlace field indication 21=0b1, video frame number 22=0x1, H-position 23=0x0000, V-position 24=0x0000;
Subpacket 18b: interlace field indication 21=0b1, video frame number 22=0x1, H-position 23=0x0780, V-position 24=0x0002;
Subpacket 18c: interlace field indication 21=0b1, video frame number 22=0x1, H-position 23=0x0000, V-position 24=0x0005;
Subpacket 18d: interlace field indication 21=0b1, video frame number 22=0x1, H-position 23=0x0780, V-position 24=0x0007;
. . . ;

Subpackets 18a to 18d of 432nd Packet:
Subpacket 18a: interlace field indication 21=0b1, video frame number 22=0x7, H-position 23=0x0000, V-position 24=0x0212;
Subpacket 18b: interlace field indication 21=0b1, video frame number 22=0x7, H-position 23=0x0780, V-position 24=0x0214;
Subpacket 18c: interlace field indication 21=0b1, video frame number 22=0x7, H-position 23=0x0000, V-position 24=0x0217;

Subpacket 18d: interlace field indication 21=0b1, video frame number 22=0x7, H-position 23=0x0780, V-position 24=0x0219;

Subpackets 18a to 18d of 433rd Packet:

Subpacket 18a: interlace field indication 21=0b0, video frame number 22=0x0, H-position 23=0x0000, V-position 24=0x0000;

Subpacket 18b: interlace field indication 21=0b0, video frame number 22=0x0, H-position 23=0x0780, V-position 24=0x0002;

Subpacket 18c: interlace field indication 21=0b0, video frame number 22=0x0, H-position 23=0x0000, V-position 24=0x0005;

Subpacket 18d: interlace field indication 21=0b0, video frame number 22=0x0, H-position 23=0x0780, V-position 24=0x0007; and sequences similar to above will subsequently follow.

In this case, it is assumed that 0b0 (unsupported) is stored in the partition index 20. In addition, it is assumed that there is no packet re-forwarding due to transmission errors.

The combined video frame data 43 is thus transmitted in a form of packet by using 54 packets every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position data for the vertical display time interval Tv of the combined video frame data 43 obtained by combining the left-eye video frame data 41 with the right-eye video frame data 42 are stored in the H-position 23 and the V-position 24, respectively, as the data for identifying the left-eye video frame data 41 and the right-eye video frame data 42. Therefore, it is possible to identify the left-eye video frame data 41 and the right-eye video frame data 42 transmitted in a form of packet, and to efficiently transmit the AV contents data including the two-dimensional video data and the AV contents including the three-dimensional video data in the same packet format.

Third Preferred Embodiment

Figure 6:
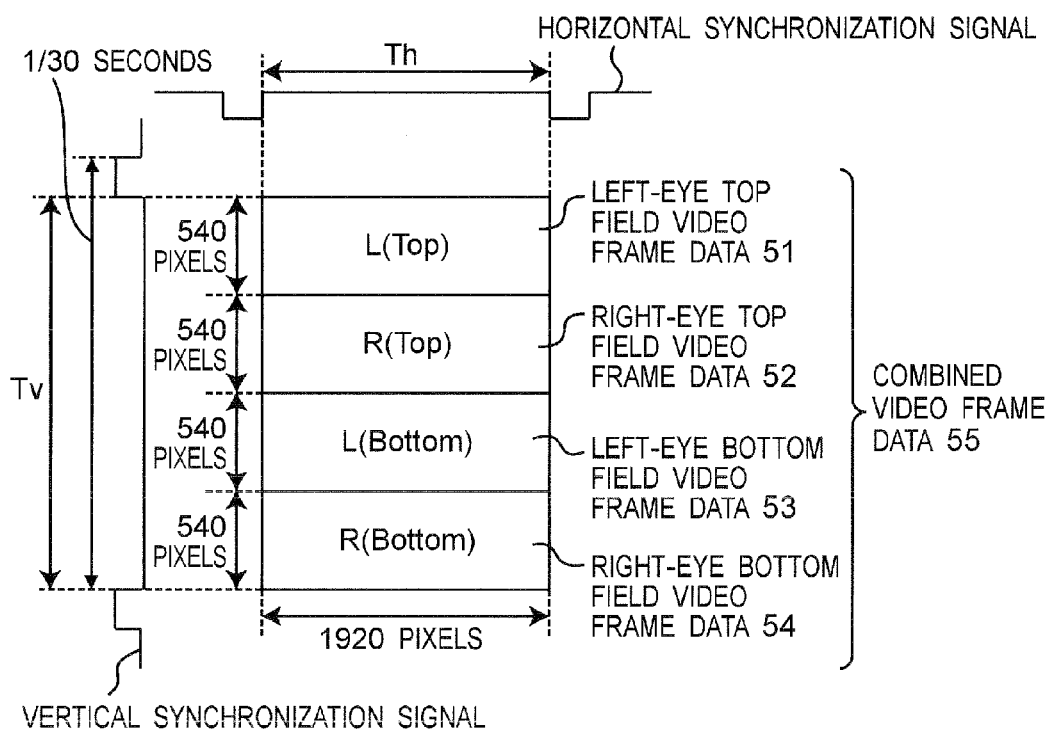
FIG. 6 is a data configuration diagram of combined video frame data 53 according to a third preferred embodiment of the present invention, where the diagram is shown based on a relation between the horizontal synchronization signal and the vertical synchronization signal.

FIG. 6 is a data configuration diagram of combined video frame data 53 according to a third preferred embodiment of the present invention, where the diagram is shown based on a relation between the horizontal synchronization signal and the vertical synchronization signal. The present preferred embodiment is different from the first preferred embodiment only in the generating method of the combined video frame data 55. The other points are similar to those of the first preferred embodiment, and therefore, no description of the operation is herein provided therefor.

FIG. 6 shows the format of the combined video frame data 55 when the VIC is 64. Referring to FIG. 6, each of left-eye top field video frame data 51, right-eye top field video frame data 52, left-eye bottom field video frame data 53 and right-eye bottom field video frame data 54 has the number of horizontal active pixels of 1920 pixels and the number of vertical active pixels of 540 pixels. In addition, the combined video frame data 55 has the number of horizontal pixels of 1920 pixels and the number of vertical pixels of 2160 pixels. Further, the vertical synchronization frequency of the left-eye top field video frame data 51, the right-eye top field video frame data 52, the left-eye bottom field video frame data 53 and the right-eye bottom field video frame data 54 is 30 Hz. The packet processing circuit 113 combines the left-eye top field video frame data 51, the right-eye top field video frame data 52, the left-eye bottom field video frame data 53 and the right-eye bottom field video frame data 54 into the combined video frame data 55. In this case, the combined video frame data 55 is generated for the horizontal display time interval Th so that the left-eye top field video frame data 51 of 540 lines is transmitted for the first quarter interval of the vertical display time interval Tv, the right-eye top field video frame data 52 of 540 lines is transmitted for the second quarter interval, the left-eye bottom field video frame data 53 of 540 lines is transmitted for the third quarter interval, and the right-eye bottom field video frame data 54 of 540 lines is transmitted for the last quarter interval.

The source device 110 divides the combined video frame data 55 into a plurality of packets according to the packet format of FIG. 3, and wirelessly transmits the packets to the sink device 120. In this case, when the left-eye top field video frame data 51 is transmitted, the value stored in the H-position 23 is set to a value of 0x0000 to 0x077F (0 to 1919), and the value stored in the V-position 24 is set to a value of 0x0000 to 0x021B (0 to 539). In addition, when the right-eye top field video frame data 52 is transmitted, the value stored in the H-position 23 is set to a value of 0x0000 to 0x077F (0 to 1919), and the value stored in the V-position 24 is set to a value of 0x021C to 0x0437 (540 to 1079). Further, when the left-eye bottom field video frame data 53 is transmitted, the value stored in the H-position 23 is set to a value of 0x0000 to 0x077F (0 to 1919), and the value stored in the V-position 24 is set to a value of 0x0438 to 0x0653 (1080 to 1619). Still further, when the right-eye bottom field video frame data 54 is transmitted, the value stored in the H-position 23 is set to a value of 0x0000 to 0x077F (0 to 1919), and the value stored in the V-position 24 is set to a value of 0x0654 to 0x086F (1620 to 2159). It is noted that the values stored in the video frame numbers 22 corresponding to the left-eye top field video frame data 51, the right-eye top field video frame data 52, the left-eye bottom field video frame data 53 and the right-eye bottom field video frame data 54 in the same frame are set to be the same as each other.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:

Subpacket 18a: interlace field indication 21=0b0, video frame number 22=0x0, H-position 23=0x0000, V-position 24=0x0000;

Subpacket 18b: interlace field indication 21=0b0, video frame number 22=0x0, H-position 23=0x0000, V-position 24=0x0005;

Subpacket 18*c*: interlace field indication 21=0b0, video frame number 22=0x0, H-position 23=0x0000, V-position 24=0x000a;

Subpacket 18*d*: interlace field indication 21=0b0, video frame number 22=0x0, H-position 23=0x0000, V-position 24=0x000f;

Subpackets 18*a* to 18*d* of Second Packet:

Subpacket 18*a*: interlace field indication 21=0b0, video frame number 22=0x0, H-position 23=0x0000, V-position 24=0x0014;

Subpacket 18*b*: interlace field indication 21=0b0, video frame number 22=0x0, H-position 23=0x0780, V-position 24=0x0019;

Subpacket 18*c*: interlace field indication 21=0b0, video frame number 22=0x0, H-position 23=0x0000, V-position 24=0x001e;

Subpacket 18*d*: interlace field indication 21=0b0, video frame number 22=0x0, H-position 23=0x0780, V-position 24=0x0023;

. . . ;

Subpackets 18*a* to 18*d* of 27th Packet:

Subpacket 18*a*: interlace field indication 21=0b0, video frame number 22=0x0, H-position 23=0x0000, V-position 24=0x0208;

Subpacket 18*b*: interlace field indication 21=0b0, video frame number 22=0x0, H-position 23=0x0000, V-position 24=0x020d;

Subpacket 18*c*: interlace field indication 21=0b0, video frame number 22=0x0, H-position 23=0x0000, V-position 24=0x0212;

Subpacket 18*d*: interlace field indication 21=0b0, video frame number 22=0x0, H-position 23=0x0000, V-position 24=0x0217;

Subpackets 18*a* to 18*d* of 28th Packet:

Subpacket 18*a*: interlace field indication 21=0b0, video frame number 22=0x0, H-position 23=0x0000, V-position 24=0x021c;

Subpacket 18*b*: interlace field indication 21=0b0, video frame number 22=0x0, H-position 23=0x0000, V-position 24=0x0221;

Subpacket 18*c*: interlace field indication 21=0b0, video frame number 22=0x0, H-position 23=0x0000, V-position 24=0x0226;

Subpacket 18*d*: interlace field indication 21=0b0, video frame number 22=0x0, H-position 23=0x0000, V-position 24=0x022b;

. . . ;

Subpackets 18*a* to 18*d* of 54th Packet:

Subpacket 18*a*: interlace field indication 21=0b0, video frame number 22=0x0, H-position 23=0x0000, V-position 24=0x0424;

Subpacket 18*b*: interlace field indication 21=0b0, video frame number 22=0x0, H-position 23=0x0000, V-position 24=0x0429;

Subpacket 18*c*: interlace field indication 21=0b0, video frame number 22=0x0, H-position 23=0x0000, V-position 24=0x042e;

Subpacket 18*d*: interlace field indication 21=0b0, video frame number 22=0x0, H-position 23=0x0000, V-position 24=0x0433;

Subpackets 18*a* to 18*d* of 55th Packet:

Subpacket 18*a*: interlace field indication 21=0b1, video frame number 22=0x0, H-position 23=0x0000, V-position 24=0x0438;

Subpacket 18*b*: interlace field indication 21=0b1, video frame number 22=0x0, H-position 23=0x0000, V-position 24=0x043d;

Subpacket 18*c*: interlace field indication 21=0b1, video frame number 22=0x0, H-position 23=0x0000, V-position 24=0x0442;

Subpacket 18*d*: interlace field indication 21=0b1, video frame number 22=0x0, H-position 23=0x0000, V-position 24=0x0447;

. . . ;

Subpackets 18*a* to 18*d* of 81st Packet:

Subpacket 18*a*: interlace field indication 21=0b1, video frame number 22=0x0, H-position 23=0x0000, V-position 24=0x0640;

Subpacket 18*b*: interlace field indication 21=0b1, video frame number 22=0x0, H-position 23=0x0000, V-position 24=0x0645;

Subpacket 18*c*: interlace field indication 21=0b1, video frame number 22=0x0, H-position 23=0x0000, V-position 24=0x064a;

Subpacket 18*d*: interlace field indication 21=0b1, video frame number 22=0x0, H-position 23=0x0000, V-position 24=0x064f;

Subpackets 18*a* to 18*d* of 82nd Packet:

Subpacket 18*a*: interlace field indication 21=0b1, video frame number 22=0x0, H-position 23=0x0000, V-position 24=0x0654;

Subpacket 18*b*: interlace field indication 21=0b1, video frame number 22=0x0, H-position 23=0x0000, V-position 24=0x0659;

Subpacket 18*c*: interlace field indication 21=0b1, video frame number 22=0x0, H-position 23=0x0000, V-position 24=0x065e;

Subpacket 18*d*: interlace field indication 21=0b1, video frame number 22=0x0, H-position 23=0x0000, V-position 24=0x0663;

. . . ;

Subpackets 18*a* to 18*d* of 108th Packet:

Subpacket 18*a*: interlace field indication 21=0b1, video frame number 22=0x0, H-position 23=0x0000, V-position 24=0x085c;

Subpacket 18*b*: interlace field indication 21=0b1, video frame number 22=0x0, H-position 23=0x0000, V-position 24=0x0861;

Subpacket 18*c*: interlace field indication 21=0b1, video frame number 22=0x0, H-position 23=0x0000, V-position 24=0x0866;

Subpacket 18*d*: interlace field indication 21=0b1, video frame number 22=0x0, H-position 23=0x0000, V-position 24=0x086b;

Subpackets 18*a* to 18*d* of 109th Packet:

Subpacket 18*a*: interlace field indication 21=0b0, video frame number 22=0x1, H-position 23=0x0000, V-position 24=0x0000;

Subpacket 18*b*: interlace field indication 21=0b0, video frame number 22=0x1, H-position 23=0x0000, V-position 24=0x0005;

Subpacket 18*c*: interlace field indication 21=0b0, video frame number 22=0x1, H-position 23=0x0000, V-position 24=0x000a;

Subpacket 18*d*: interlace field indication 21=0b0, video frame number 22=0x1, H-position 23=0x0000, V-position 24=0x000f

. . . ;

Subpackets 18*a* to 18*d* of 864th Packet:

Subpacket 18*a*: interlace field indication 21=0b1, video frame number 22=0x7, H-position 23=0x0000, V-position 24=0x085c;

Subpacket 18*b*: interlace field indication 21=0b1, video frame number 22=0x7, H-position 23=0x0000, V-position 24=0x0861;

Subpacket 18*c*: interlace field indication 21=0b1, video frame number 22=0x7, H-position 23=0x0000, V-position 24=0x0866;

Subpacket 18*d*: interlace field indication 21=0b1, video frame number 22=0x7, H-position 23=0x0000, V-position 24=0x086b;

Subpackets 18*a* to 18*d* of 865th Packet:

Subpacket 18*a*: interlace field indication 21=0b0, video frame number 22=0x0, H-position 23=0x0000, V-position 24=0x0000;

Subpacket 18*b*: interlace field indication 21=0b0, video frame number 22=0x0, H-position 23=0x0000, V-position 24=0x0005;

Subpacket 18*c*: interlace field indication 21=0b0, video frame number 22=0x0, H-position 23=0x0000, V-position 24=0x000a;

Subpacket 18*d*: interlace field indication 21=0b0, video frame number 22=0x0, H-position 23=0x0000, V-position 24=0x000f; and sequences similar to above will subsequently follow.

In this case, it is assumed that the value 0b0 (unsupported) is stored in the partition index 20. In addition, it is assumed that there is no packet re-forwarding due to transmission errors.

As described above, the left-eye top field video frame data 51 of the first frame is transmitted in a form of packet in the first to 27th packets, and the right-eye top field video frame data 52 of the first frame is transmitted in a form of packet in the 28th to 54th packets. The left-eye bottom field video frame data 53 of the first frame is transmitted in a form of packet in the 55th to 81st packets, the right-eye bottom field video frame data 54 of the first frame is transmitted in a form of packet in the 82nd to 108th packets, and the combined video frame data 55 is transmitted in a form of packet by using 108 packets every video frame.

As described above, according to the present preferred embodiment, in the network for transmitting the AV contents data including the video data and the audio data are from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is three-dimensional data, the horizontal position data for the horizontal display time interval Th and the vertical position data for the vertical display time interval Tv of the combined video frame data 355 obtained by combining together the left-eye top field video frame data 51, the right-eye top field video frame data 52, the left-eye bottom field video frame data 53 and the right-eye bottom field video frame data 54 are stored in the H-position 23 and the V-position 24, respectively, as the data for identifying the left-eye top field video frame data 51, the right-eye top field video frame data 52, the left-eye bottom field video frame data 53 and the right-eye bottom field video frame data 54. Therefore, it is possible to identify the left-eye top field video frame data 51, the right-eye top field video frame data 52, the left-eye bottom field video frame data 53 and the right-eye bottom field video frame data 54 transmitted in a form of packet, and to efficiently transmit the AV contents data including the two-dimensional video data and the AV contents including the three-dimensional video data in the same packet format.

Fourth Preferred Embodiment

Figure 7:
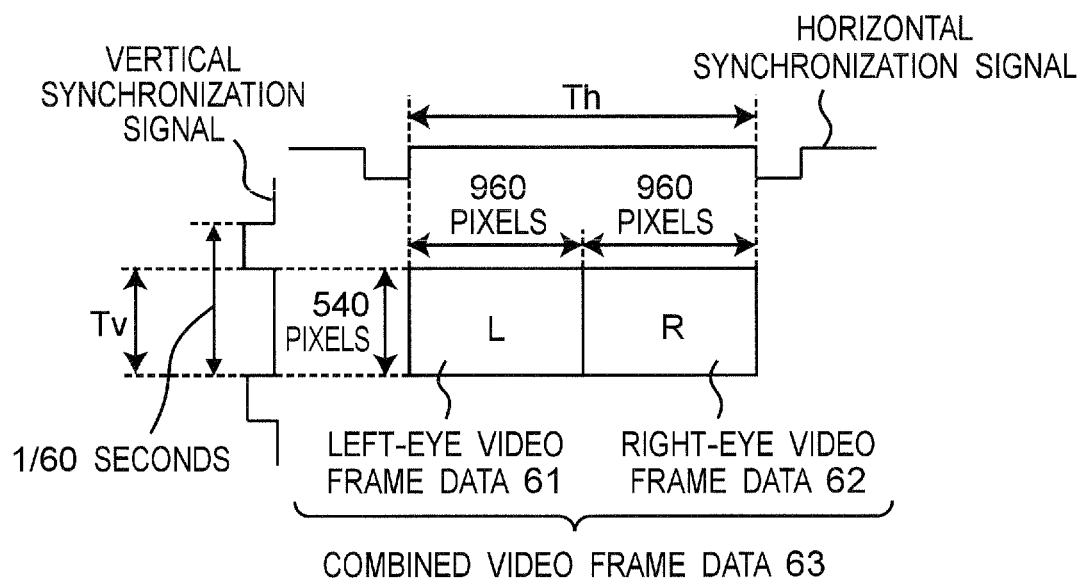
FIG. 7 is a data configuration diagram of combined video frame data 63 according to a fourth preferred embodiment of the present invention, where the diagram is shown based on a relation between the horizontal synchronization signal and the vertical synchronization signal.

FIG. 7 is a data configuration diagram of combined video frame data 63 according to a fourth preferred embodiment of the present invention, where the diagram is shown based on a relation between the horizontal synchronization signal and the vertical synchronization signal. The present preferred embodiment is different from the first preferred embodiment only in the generating method of the combined video frame data 63. The other points are similar to those of the first preferred embodiment, and therefore, no description of the operation is herein provided therefor.

FIG. 7 shows the format of the combined video frame data 63 when the VIC is 71. Referring to FIG. 7, each of the left-eye video frame data 61 and right-eye video frame data 62 has the number of horizontal active pixels of 960 pixels and the number of vertical active pixels of 540 pixels. In addition, the combined video frame data 63 has the number of horizontal pixels of 1920 pixels and the number of vertical pixels of 540 pixels. Further, the vertical synchronization frequency of the left-eye video frame data 61 and right-eye video frame data 62 is 60 Hz. The packet processing circuit 113 combines the left-eye video frame data 61 with the right-eye video frame data 62 into the combined video frame data 63. In this case, the combined video frame data 63 is configured in the vertical display time interval Tv so that the left-eye video frame data 61 of 960 pixels is transmitted for the first half of the horizontal display time interval Th, and thereafter, the right-eye video frame data 62 of 960 pixels is transmitted for the latter half of the horizontal display time interval Th.

The source device 110 divides the combined video frame data 63 into a plurality of packets according to the packet format of FIG. 3, and wirelessly transmits the packets to the sink device 120. In this case, when the left-eye video frame data 61 is transmitted, the value stored in the H-position 23 is set to a value of 0x0000 to 0x03BF (0 to 959), and the value stored in the V-position 24 is set to a value of 0x0000 to 0x021B (0 to 539). On the other hand, when the right-eye video frame data 62 is transmitted, the value stored in the H-position 23 is set to a value of 0x03C0 to 0x07FF (960 to 1919), and the value stored in the V-position 24 is set to a value of 0x0000 to 0x021B (0 to 539). It is noted that the values stored in the video frame numbers 22 corresponding to the left-eye video frame data 61 and the right-eye video frame data 62 in the same frame are set to be the same as each other.

In this case, as one example, it is assumed that the packet body 15 includes the subpacket 18*a* to the subpacket 18*d*, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17*a*, 17*b*, 17*c* and 17*d* provided so as to correspond to each subpacket are set as follows, and are sequentially transmitted.

Subpackets 18*a* to 18*d* of First Packet:

Subpacket 18*a*: interlace field indication 21=0b0, video frame number 22=0x0, H-position 23=0x0000, V-position 24=0x0000;

Subpacket 18*b*: interlace field indication 21=0b0, video frame number 22=0x0, H-position 23=0x0000, V-position 24=0x0005;

Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f;
Subpackets 18a to 18d of Second Packet:
Subpacket 18a: interlace field indication 21=0b0, video frame number 22=0x0, H-position 23=0x0000, V-position 24=0x0014;
Subpacket 18b: interlace field indication 21=0b0, video frame number 22=0x0, H-position 23=0x0000, V-position 24=0x0019;
Subpacket 18c: interlace field indication 21=0b0, video frame number 22=0x0, H-position 23=0x0000, V-position 24=0x001e;
Subpacket 18d: interlace field indication 21=0b0, video frame number 22=0x0, H-position 23=0x0000, V-position 24=0x0023;
. . . ;
Subpackets 18a to 18d of 27th Packet:
Subpacket 18a: interlace field indication 21=0b0, video frame number 22=0x0, H-position 23=0x0000, V-position 24=0x0208;
Subpacket 18b: interlace field indication 21=0b0, video frame number 22=0x0, H-position 23=0x0000, V-position 24=0x020d;
Subpacket 18c: interlace field indication 21=0b0, video frame number 22=0x0, H-position 23=0x0000, V-position 24=0x0212;
Subpacket 18d: interlace field indication 21=0b0, video frame number 22=0x0, H-position 23=0x0000, V-position 24=0x0217;
Subpackets 18a to 18d of 28th Packet:
Subpacket 18a: interlace field indication 21=0b1, video frame number 22=0x1, H-position 23=0x0000, V-position 24=0x0000;
Subpacket 18b: interlace field indication 21=0b1, video frame number 22=0x1, H-position 23=0x0000, V-position 24=0x0005;
Subpacket 18c: interlace field indication 21=0b1, video frame number 22=0x1, H-position 23=0x0000, V-position 24=0x000a;
Subpacket 18d: interlace field indication 21=0b1, video frame number 22=0x1, H-position 23=0x0000, V-position 24=0x000f;
. . . ;
Subpackets 18a to 18d of 216th Packet:
Subpacket 18a: interlace field indication 21=0b1, video frame number 22=0x7, H-position 23=0x0000, V-position 24=0x0208;
Subpacket 18b: interlace field indication 21=0b1, video frame number 22=0x7, H-position 23=0x0000, V-position 24=0x020d;
Subpacket 18c: interlace field indication 21=0b1, video frame number 22=0x7, H-position 23=0x0000, V-position 24=0x0212;
Subpacket 18d: interlace field indication 21=0b1, video frame number 22=0x7, H-position 23=0x0000, V-position 24=0x0217;
Subpackets 18a to 18d of 217th Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0780, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0780, V-position 24=0x000f; and
sequences similar to above will subsequently follow.

In this case, it is assumed that the value 0b0 (unsupported) is stored in the partition index 20. In addition, it is assumed that there is no packet re-forwarding due to transmission errors.

As described above, the combined video frame data 63 is transmitted in a form of packet by using 27 packets every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data in the horizontal display time interval Th and the vertical position data for the vertical display time interval Tv of the combined video frame data 63 obtained by combining the left-eye video frame data 61 with the right-eye video frame data 62 are stored in the H-position 23 and the V-position 24, respectively, as the data for identifying the left-eye video frame data 61 and the right-eye video frame data 62. Therefore, it is possible to identify the left-eye video frame data 61 and the right-eye video frame data 62 transmitted in a form of packet, and to efficiently transmit the AV contents data including the two-dimensional video data and the AV contents including the three-dimensional video data in the same packet format.

Fifth Preferred Embodiment

Figure 8:
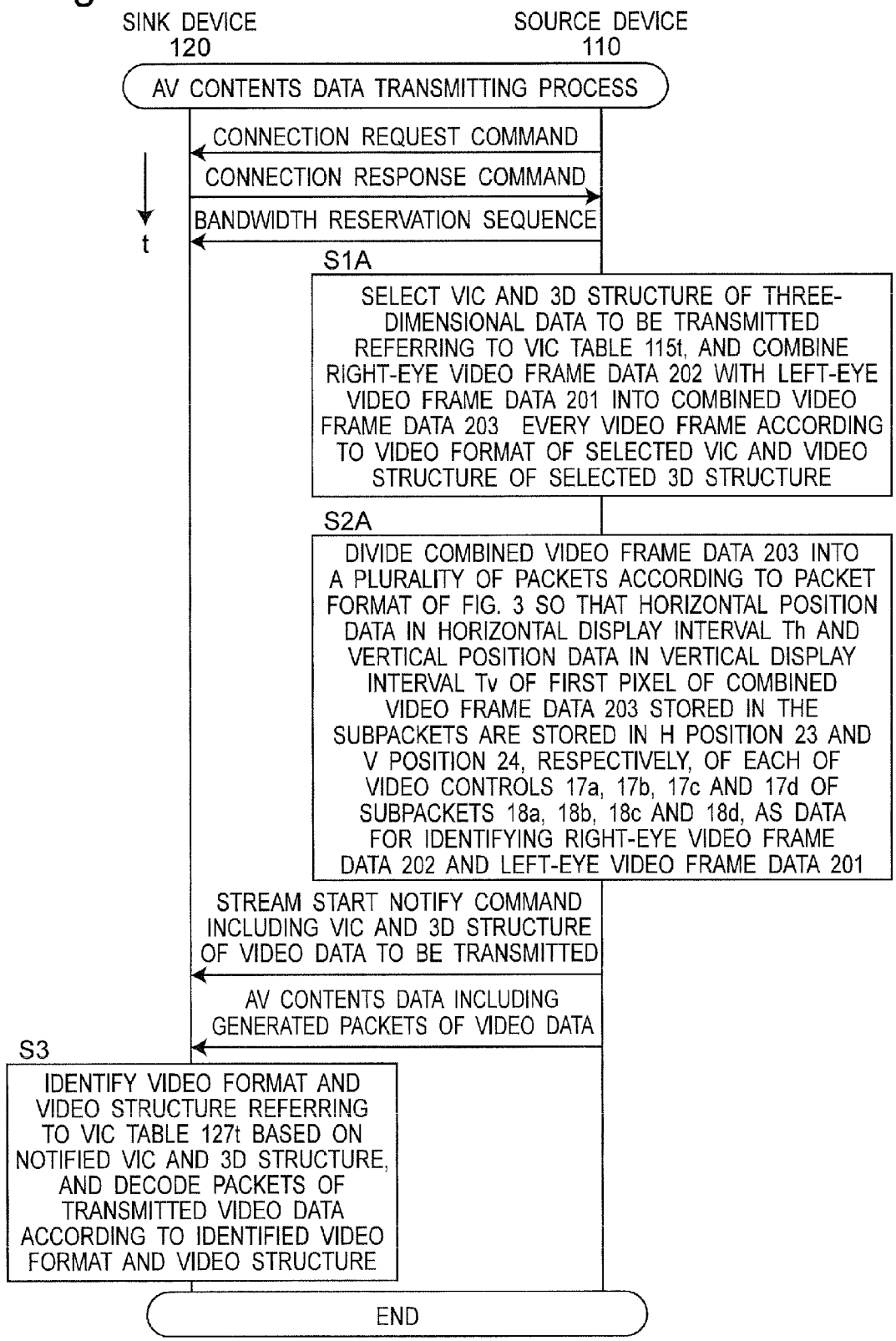
FIG. 8 is a sequence diagram showing an AV contents data transmitting process according to a fifth preferred embodiment of the present invention.

FIG. 8 is a sequence diagram showing an AV contents data transmitting process according to the fifth preferred embodiment of the present invention, and FIG. 9 is a data configuration diagram of combined video frame data 203 according to a fifth preferred embodiment of the present invention, where the diagram is shown based on a relation between the horizontal synchronization signal and the vertical synchronization signal. The present preferred embodiment is different from the first preferred embodiment in the following points.

(a) The source device 110 previously stores a VIC table 115t in the memory 115, where the VIC table 115t includes VICs for identifying a plurality of video formats of the two-dimensional data and 3D structures for identifying the video structures of the three-dimensional data, and the sink device 120 previously stores a VIC table 127t in the memory 127, where the VIC table 127t includes VICs for identifying a plurality of video formats of the two-dimensional data and 3D structures for identifying the video structures of the three-dimensional data.

(b) The source device 110 notifies the sink device 120 of the VIC and the 3D structure of the video data to be transmitted, and the sink device 120 identifies the video format and the video structure with reference to the VIC table 127t based on notified VIC and 3D structure and decodes packets of transmitted video data according to identified video format and 3D structure.

(c) A blanking time interval 209 is provided between a transmission time interval of left-eye video frame data 201 and a transmission time interval of right-eye video frame data 202.

Only the differences from the first preferred embodiment are described below.

In the present preferred embodiment, the VICs of 1 to 37 and 128 to 136 are allocated to the video formats of the respective two-dimensional data. In addition, the 3D structure is a code that represents a transmission format of the video structure of the three-dimensional data, and identifies the order of transmission and timings of transmission of the data such as the left-eye video frame data, the right-eye video frame data, the left-eye top field video frame data, the right-eye top field video frame data, the left-eye bottom field video frame data and the right-eye bottom field video frame data included in the three-dimensional data. The memory 115 previously stores the VIC table 115t that includes the VICs and the 3D structures, and the memory 127 previously stores the table 127t that includes the VICs and the 3D structures.

Next, there will be described the packet transmitting method of the AV contents data, which includes the three-dimensional data, from the source device 110 to the sink device with reference to FIG. 8. Referring to FIG. 8, the processes to the bandwidth reservation sequence are executed in manners similar to those of the processes to the bandwidth reservation sequence in the AV contents data transmitting process of the first preferred embodiment shown in FIG. 4. Subsequent to the bandwidth reservation sequence, in step S1A, the controller 111 of the source device 110 selects the VIC and the 3D structure of the three-dimensional data to be transmitted with reference to the VIC table 115t. Then, the controller 111 controls the packet processing circuit 113 to combine the right-eye video frame data 202 and the left-eye video frame data 201 into the combined video frame data 203 every video frame, according to the video format of the selected VIC and the video structure of the selected 3D structure. Further, in step S2A, the controller 111 of the source device 110 controls the packet processing circuit 113 to divide the combined video frame data 203 into a plurality of packets according to the packet format of FIG. 3. In response to this, the packet processing circuit 113 divides the combined video frame data 203 into the plurality of packets according to the packet format of FIG. 3, so that the horizontal position data for the horizontal display time interval Th and the vertical position data for the vertical display time interval Tv of the first pixel of the combined video frame data 203 stored in the subpackets are stored in the H-position 23 and the V-position 24, respectively, of each of the video controls 17a, 17b, 17c and 17d of the subpackets 18a, 18b, 18c and 18d, as the data for identifying the right-eye video frame data 202 and the left-eye video frame data 201.

Next, the source device 110 wirelessly transmits a stream start notification (STREAM_START_NOTIFY) command to the sink device 120. In the present preferred embodiment, the stream start notification message includes the VIC and the 3D structure of the video data to be transmitted. Then, the source device 110 wirelessly transmits a plurality of generated packets to the sink device 120 for the allocated reservation time period. The sink device 120 identifies the video format and the video structure with reference to the VIC table 127t based on notified VIC and 3D structure, and controls the packet processing circuit 123 to decode the packets of the transmitted video data according to the identified video format and the video structure. In this case, the packet processing circuit 123 identifies the right-eye video frame data 202 and the left-eye video frame data 201 based on the horizontal position data stored in the H-position 23 and the vertical position data stored in the V-position 24 of each packet of the received video data. It is noted that the two-dimensional data and the audio data are wirelessly transmitted to the sink device 120 in the present preferred embodiment in a manner similar to that of the first preferred embodiment.

FIG. 9 is a data configuration diagram of the combined video frame data 203 according to the fifth preferred embodiment of the present invention, where the diagram is shown based on a relation between the horizontal synchronization signal and the vertical synchronization signal. FIG. 9 shows the format of the combined video frame data 203 when the VIC is 32 and the 3D structure represents frame packing. Referring to FIG. 9, each of the left-eye video frame data 201 and the right-eye video frame data 202 has the number of horizontal active pixels of 1920 pixels and the number of vertical active pixels of 1080 pixels. In addition, the combined video frame data 203 has the number of horizontal pixels of 1920 pixels and the number of vertical pixels of 2205 pixels. Further, the vertical synchronization frequency of the left-eye video frame data 201 and the right-eye video frame data 202 is 23.976 Hz. The packet processing circuit 113 combines the left-eye video frame data 201 with the right-eye video frame data 202 into the combined video frame data 203. In this case, the combined video frame data 203 is generated for the horizontal display time interval Th so that the left-eye video frame data 201 of 1080 lines is transmitted for the first half of the vertical display time interval Tv, and thereafter, the right-eye video frame data 202 of 1080 lines is transmitted for the latter half of the vertical display time interval Tv. Further, a blanking time interval 209 is provided between the transmission time interval of the left-eye video frame data 201 and the transmission time interval of the right-eye video frame data 202.

The source device 110 divides the combined video frame data 203 into a plurality of packets according to the packet format of FIG. 3, and wirelessly transmits the packets to the sink device 120. In this case, when the left-eye video frame data 201 is transmitted, the value stored in the H-position 23 is set to a value of 0x0000 to 0x077F (0 to 1919), and the value stored in the V-position 24 is set to a value of 0x0000 to 0x0437 (0 to 1079). On the other hand, when the right-eye video frame data 202 is transmitted, the value stored in the H-position 23 is set to a value of 0x0000 to 0x077F (0 to 1919), and the value stored in the V-position 24 is set to a value of 0x0465 to 0x089C (1125 to 2204). In addition, when the blanking time interval 209 is transmitted, the value stored in the H-position 23 is set to a value of 0x0000 to 0x077F (0 to 1919), and the value stored in the V-position 24 is set to a value of 0x0438 to 0x0464 (1080 to 1124). It is noted that the values stored in the video frame numbers 22 corresponding to the left-eye video frame data 201, the right-eye video frame data 202 and the blanking time interval 209 in the same frame are set to be the same as each other.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f;

Subpackets 18a to 18d of Second Packet:
Subpacket 18a: interlace field indication 21=0b0, video frame number 22=0x0, H-position 23=0x0000, V-position 24=0x0014;
Subpacket 18b: interlace field indication 21=0b0, video frame number 22=0x0, H-position 23=0x0000, V-position 24=0x0019;
Subpacket 18c: interlace field indication 21=0b0, video frame number 22=0x0, H-position 23=0x0000, V-position 24=0x001e;
Subpacket 18d: interlace field indication 21=0b0, video frame number 22=0x0, H-position 23=0x0000, V-position 24=0x0023;
. . . ;
Subpackets 18a to 18d of 110th Packet:
Subpacket 18a: interlace field indication 21=0b0, video frame number 22=0x0, H-position 23=0x0000, V-position 24=0x0884;
Subpacket 18b: interlace field indication 21=0b0, video frame number 22=0x0, H-position 23=0x0000, V-position 24=0x0889;
Subpacket 18c: interlace field indication 21=0b0, video frame number 22=0x0, H-position 23=0x0000, V-position 24=0x088E;
Subpacket 18d: interlace field indication 21=0b0, video frame number 22=0x0, H-position 23=0x0000, V-position 24=0x0893;

Subpackets 18a to 18d of 111st Packet:
Subpacket 18a: interlace field indication 21=0b0, video frame number 22=0x0, H-position 23=0x0000, V-position 24=0x0898;
Subpacket 18b: interlace field indication 21=0b0, video frame number 22=0x1, H-position 23=0x0000, V-position 24=0x0000;
Subpacket 18c: interlace field indication 21=0b0, video frame number 22=0x1, H-position 23=0x0000, V-position 24=0x0005;
Subpacket 18d: interlace field indication 21=0b0, video frame number 22=0x1, H-position 23=0x0000, V-position 24=0x000a;
. . . ;
Subpackets 18a to 18d of 883rd Packet:
Subpacket 18a: interlace field indication 21=0b0, video frame number 22=0x7, H-position 23=0x0000, V-position 24=0x0889;
Subpacket 18b: interlace field indication 21=0b0, video frame number 22=0x7, H-position 23=0x0000, V-position 24=0x088E;
Subpacket 18c: interlace field indication 21=0b0, video frame number 22=0x7, H-position 23=0x0000, V-position 24=0x0893;
Subpacket 18d: interlace field indication 21=0b0, video frame number 22=0x7, H-position 23=0x0000, V-position 24=0x0899;

Subpackets 18a to 18d of 884th Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f; and
sequences similar to above will subsequently follow.

In this case, it is assumed that the value 0b0 (unsupported) is stored in the partition index 20. In addition, it is assumed that there is no packet re-forwarding due to transmission errors.

As described above, the left-eye top field video frame data 201 of the first frame is transmitted in a form of packet in the first to 54th packets, the blanking time interval 209 is transmitted in a form of packet in the 55th to 57th packets, and the right-eye video frame data 202 of the first frame is transmitted in a form of packet in the 57th packet to the 111st packet. In a manner similar to above, the combined video frame data 203 is subsequently transmitted in a form of packet by using 110 packets and one subpacket every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position data for the vertical display time interval Tv of the combined video frame data 203 obtained by combining the left-eye video frame data 201 with the right-eye video frame data 202 are stored in the H-position 23 and the V-position 24, respectively, as the data for identifying the left-eye video frame data 201 and the right-eye video frame data 202. Therefore, it is possible to identify the left-eye video frame data 201 and the right-eye video frame data 202 transmitted in a form of packet, and to efficiently transmit the AV contents data including the two-dimensional video data and the AV contents including the three-dimensional video data in the same packet format.

Sixth Preferred Embodiment

FIG. 10 is a data configuration diagram of combined video frame data 143 according to a sixth preferred embodiment of the present invention, where the diagram is shown based on a relation between the horizontal synchronization signal and the vertical synchronization signal. The present preferred embodiment is different from the fifth preferred embodiment only in the generating method of the combined video frame data 143. The other points are similar to those of the fifth preferred embodiment, and therefore, no description of the operation is herein provided therefor.

FIG. 10 shows the format of the combined video frame data 143 when the VIC is 16 and the 3D structure represents side by side (full). Referring to FIG. 10, each of the left-eye video frame data 141 and the right-eye video frame data 142 has the number of horizontal active pixels of 1920 pixels and the number of vertical active pixels of 1080 pixels. In addition, the combined video frame data 143 has the number of horizontal pixels of 3840 pixels and the number of vertical pixels of 1080 pixels. Further, the vertical synchronization frequency of the left-eye video frame data 141 and the right-eye video frame data 142 is 60 Hz. The packet processing circuit 113 combines the left-eye video frame data 141 with the right-eye video frame data 142 into the combined video frame data 143. In this case, the combined video frame data 143 is generated for the vertical display time interval Tv so that the left-eye video frame data 141 of 1920 pixels is transmitted for the first half of the horizontal display time interval Th, and thereafter, the right-eye video frame data 142 of 1920 pixels is transmitted for the latter half of the horizontal display time interval Th.

The source device 110 divides the combined video frame data 143 into a plurality of packets according to the packet format of FIG. 3, and wirelessly transmits the packets to the sink device 120. In this case, when the left-eye video frame data 141 is transmitted, the value stored in the H-position 23 is set to a value of 0x0000 to 0x077F (0 to 1919), and the value stored in the V-position 24 is set to a value of 0x0000 to 0x0438 (0 to 1079). On the other hand, when the right-eye video frame data 142 is transmitted, the value stored in the H-position 23 is set to a value of 0x0780 to 0x0EFF (1920 to 3839), and the value stored in the V-position 24 is set to a value of 0x0000 to 0x0438 (0 to 1079). It is noted that the values stored in the video frame numbers 22 corresponding to the left-eye video frame data 141 and the right-eye video frame data 142 in the same frame are set to be the same as each other.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0780, V-position 24=0x0002;
Subpacket 18c: interlace field indication 21=0b0, video frame number 22=0x0, H-position 23=0x0000, V-position 24=0x0005;
Subpacket 18d: interlace field indication 21=0b0, video frame number 22=0x0, H-position 23=0x0780, V-position 24=0x0007;

Subpackets 18a to 18d of Second Packet:
Subpacket 18a: interlace field indication 21=0b0, video frame number 22=0x0, H-position 23=0x0000, V-position 24=0x000a;
Subpacket 18b: interlace field indication 21=0b0, video frame number 22=0x0, H-position 23=0x0780, V-position 24=0x000c;
Subpacket 18c: interlace field indication 21=0b0, video frame number 22=0x0, H-position 23=0x0000, V-position 24=0x000f;
Subpacket 18d: interlace field indication 21=0b0, video frame number 22=0x0, H-position 23=0x0780, V-position 24=0x0011;
. . . ;

Subpackets 18a to 18d of 108th Packet:
Subpacket 18a: interlace field indication 21=0b0, video frame number 22=0x0, H-position 23=0x0000, V-position 24=0x042E;
Subpacket 18b: interlace field indication 21=0b0, video frame number 22=0x0, H-position 23=0x0780, V-position 24=0x0430;
Subpacket 18c: interlace field indication 21=0b0, video frame number 22=0x0, H-position 23=0x0000, V-position 24=0x0433;
Subpacket 18d: interlace field indication 21=0b0, video frame number 22=0x0, H-position 23=0x0780, V-position 24=0x0435;

Subpackets 18a to 18d of 109th Packet:
Subpacket 18a: interlace field indication 21=0b0, video frame number 22=0x1, H-position 23=0x0000, V-position 24=0x0000;
Subpacket 18b: interlace field indication 21=0b0, video frame number 22=0x1, H-position 23=0x0780, V-position 24=0x0002;
Subpacket 18c: interlace field indication 21=0b0, video frame number 22=0x1, H-position 23=0x0000, V-position 24=0x0005;
Subpacket 18d: interlace field indication 21=0b0, video frame number 22=0x1, H-position 23=0x0780, V-position 24=0x0007;
. . . ;

Subpackets 18a to 18d of 864th Packet:
Subpacket 18a: interlace field indication 21=0b0, video frame number 22=0x7, H-position 23=0x0000, V-position 24=0x042E;
Subpacket 18b: interlace field indication 21=0b0, video frame number 22=0x7, H-position 23=0x0780, V-position 24=0x0430;
Subpacket 18c: interlace field indication 21=0b0, video frame number 22=0x7, H-position 23=0x0000, V-position 24=0x0433;
Subpacket 18d: interlace field indication 21=0b0, video frame number 22=0x7, H-position 23=0x0780, V-position 24=0x0435;

Subpackets 18a to 18d of 865th Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0780, V-position 24=0x0002;
Subpacket 18c: interlace field indication 21=0b0, video frame number 22=0x0, H-position 23=0x0000, V-position 24=0x0005;
Subpacket 18d: interlace field indication 21=0b0, video frame number 22=0x0, H-position 23=0x0780, V-position 24=0x0007; and
sequences similar to above will subsequently follow.

In this case, it is assumed that the value 0b0 (unsupported) is stored in the partition index 20. In addition, it is assumed that there is no packet re-forwarding due to transmission errors.

The combined video frame data 143 is thus transmitted in a form of packet by using 108 packets every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Then, when the video data is the three-dimensional data, the horizontal position data for the horizontal display time interval Th and the vertical position data for the vertical display time interval Tv of the combined video frame data 143 obtained by combining the left-eye video frame data 141 with the right-eye video frame data 142 are stored in the H-position 23 and the V-position 24, respectively, as the data for identifying the left-eye video frame data 141 and the right-eye video frame data 142. Therefore, it is possible to identify the left-eye video frame data 141 and the right-eye video frame data 142 transmitted in a form of packet, and to efficiently transmit the AV contents data including the two-dimensional video data and the AV contents including the three-dimensional video data in the same packet format.

Seventh Preferred Embodiment

Figure 11:
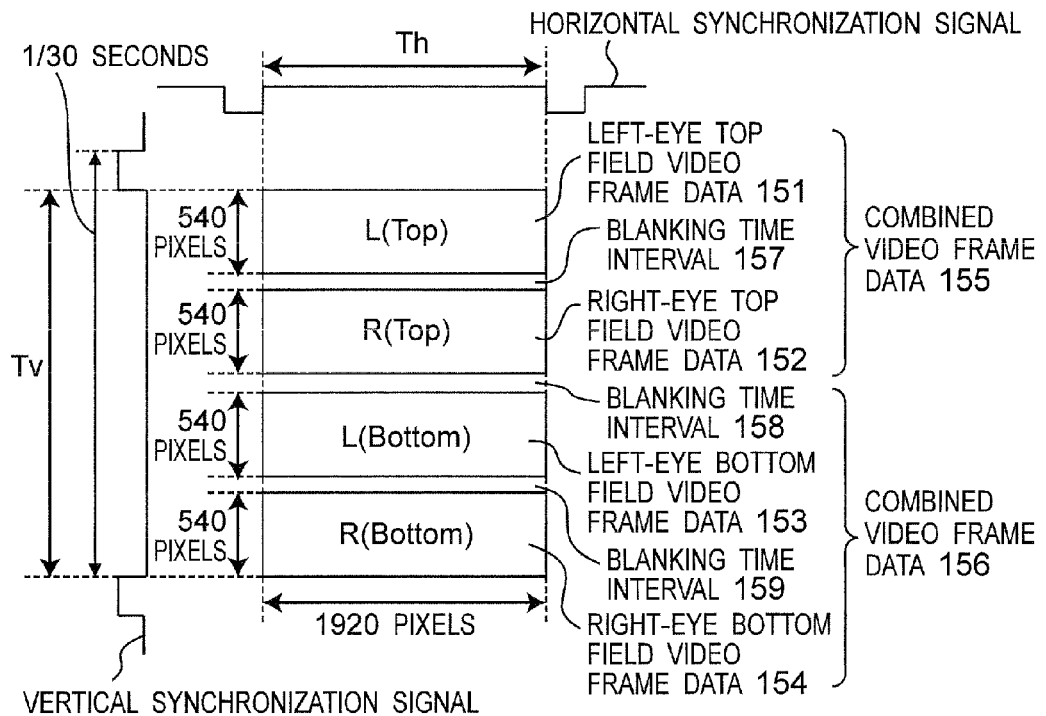
FIG. 11 is a data configuration diagram of combined video frame data 155 and 156 according to a seventh preferred embodiment of the present invention, where the diagram is shown based on a relation between the horizontal synchronization signal and the vertical synchronization signal.

FIG. 11 is a data configuration diagram of combined video frame data 155 and 156 according to a seventh preferred embodiment of the present invention, where the diagram is shown based on a relation between the horizontal synchronization signal and the vertical synchronization signal. The present preferred embodiment is different from the fifth preferred embodiment only in the generating method of the combined video frame data 155 and the combined video frame data 156. The other points are similar to those of the fifth preferred embodiment, and therefore, no description of the operation is herein provided therefor.

FIG. 11 shows the format of the combined video frame data 155 and the combined video frame data 156 when the VIC is 5 and the 3D structure represents frame packing. Referring to FIG. 11, each of left-eye top field video frame data 151, right-eye top field video frame data 152, left-eye bottom field video frame data 153 and right-eye bottom field video frame data 154 has the number of horizontal active pixels of 1920 pixels and the number of vertical active pixels of 540 pixels. In addition, each of the combined video frame data 155 and the combined video frame data 156 has the number of horizontal pixels of 1920 pixels and the number of vertical pixels of 1080 pixels. Further, the vertical synchronization frequency of the left-eye top field video frame data 151, the right-eye top field video frame data 152, the left-eye bottom field video frame data 153 and the right-eye bottom field video frame data 154 is 30 Hz. The packet processing circuit 113 combines the left-eye top field video frame data 151 with the right-eye top field video frame data 152 into the combined video frame data 155, and combines the left-eye bottom field video frame data 153 with the right-eye bottom field video frame data 154 into the combined video frame data 156. In this case, the left-eye top field video frame data 151 is generated for the horizontal display time interval Th so that the left-eye top field video frame data 151 of 540 lines is transmitted for the first interval of the vertical display time interval Tv, and thereafter, the right-eye top field video frame data 152 of 540 lines is transmitted for the second interval of the vertical display time interval Tv. Next, the combined video frame data 156 is generated so that the left-eye bottom field video frame data 153 of 540 lines is transmitted for the third interval of the vertical display time interval Tv, and thereafter, the right-eye bottom field video frame data 154 of 540 lines is transmitted for the fourth interval of the vertical display time interval Tv. In addition, a blanking time interval 157 is provided between the transmission time interval of the left-eye top field video frame data 151 and the transmission time interval of the right-eye top field video frame data 152, a blanking time interval 158 is provided between the right-eye top field video frame data 152 and the left-eye bottom field video frame data 153, and a blanking time interval 159 is provided between the transmission time interval of the left-eye bottom field video frame data 153 and the transmission time interval of the right-eye bottom field video frame data 154. It is noted that the first to fourth intervals and the blanking time intervals 157 to 159 described above are arranged in the order of the first interval, the blanking time interval 157, the second interval, the blanking time interval 158, the third interval, the blanking time interval 159, and the fourth interval within the time interval from the start timing to the end timing of each vertical display time interval Tv.

The source device 110 divides the combined video frame data 155 and the combined video frame data 156 into a plurality of packets according to the packet format of FIG. 3, and wirelessly transmits the packets to the sink device 120. In this case, when the left-eye top field video frame data 151 is transmitted, the value stored in the H-position 23 is set to a value of 0x0000 to 0x077F (0 to 1919), and the value stored in the V-position 24 is set to a value of 0x0000 to 0x021B (0 to 539). In addition, when the right-eye top field video frame data 152 is transmitted, the value stored in the H-position 23 is set to a value of 0x0000 to 0x077F (0 to 1919), and the value stored in the V-position 24 is set to a value of 0x0233 to 0x044E (563 to 1102). Further, when the left-eye bottom field video frame data 153 is transmitted, the value stored in the H-position 23 is set to a value of 0x0000 to 0x077F (0 to 1919), and the value stored in the V-position 24 is set to a value of 0x0465 to 0x0680 (1125 to 1664). Still further, when the right-eye bottom field video frame data 154 is transmitted, the value stored in the H-position 23 is set to a value of 0x0000 to 0x077F (0 to 1919), and the value stored in the V-position 24 is set to a value of 0x0698 to 0x08B3 (1688 to 2227). In addition, when the first interval and the blanking time interval 157 are transmitted, the value stored in the H-position 23 is set to a value of 0x0000 to 0x077F (0 to 1919), and the value stored in the V-position 24 is set to a value of 0x021C to 0x0232 (540 to 562). Further, when the second interval and the blanking time interval 158 are transmitted, the value stored in the H-position 23 is set to a value of 0x0000 to 0x077F (0 to 1919), and the value stored in the V-position 24 is set to a value of 0x044F to 0x0464 (1103 to 1124). Further, when the third interval and the blanking time interval 159 are transmitted, the value stored in the H-position 23 is set to a value of 0x0000 to 0x077F (0 to 1919), and the value stored in the V-position 24 is set to a value of 0x0681 to 0x0697 (1665 to 1687). It is noted that the values stored in the video frame numbers 22 corresponding to the left-eye top field video frame data 151, the right-eye top field video frame data 152, the left-eye bottom field video frame data 153 and the right-eye bottom field video frame data 154 in the same frame are set to be the same as each other.

In this case, as one example, it is assumed that the packet body 15 includes the subpacket 18*a* to the subpacket 18*d*, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17*a*, 17*b*, 17*c* and 17*d* provided so as to correspond to each subpacket are set as follows, and are sequentially transmitted.

Subpackets 18*a* to 18*d* of First Packet:
Subpacket 18*a*: interlace field indication 21=0b0, video frame number 22=0x0, H-position 23=0x0000, V-position 24=0x0000;
Subpacket 18*b*: interlace field indication 21=0b0, video frame number 22=0x0, H-position 23=0x0000, V-position 24=0x0005;
Subpacket 18*c*: interlace field indication 21=0b0, video frame number 22=0x0, H-position 23=0x0000, V-position 24=0x000a;
Subpacket 18*d*: interlace field indication 21=0b0, video frame number 22=0x0, H-position 23=0x0000, V-position 24=0x000f;

Subpackets 18*a* to 18*d* of Second Packet:
Subpacket 18*a*: interlace field indication 21=0b0, video frame number 22=0x0, H-position 23=0x0000, V-position 24=0x0014;
Subpacket 18*b*: interlace field indication 21=0b0, video frame number 22=0x0, H-position 23=0x0780, V-position 24=0x0019;
Subpacket 18*c*: interlace field indication 21=0b0, video frame number 22=0x0, H-position 23=0x0000, V-position 24=0x001e;
Subpacket 18*d*: interlace field indication 21=0b0, video frame number 22=0x0, H-position 23=0x0780, V-position 24=0x0023;
. . . ;

Subpackets 18*a* to 18*d* of 56th Packet:
Subpacket 18*a*: interlace field indication 21=0b0, video frame number 22=0x0, H-position 23=0x0000, V-position 24=0x044D;
Subpacket 18*b*: interlace field indication 21=0b0, video frame number 22=0x0, H-position 23=0x0000, V-position 24=0x0452;
Subpacket 18*c*: interlace field indication 21=0b0, video frame number 22=0x0, H-position 23=0x0000, V-position 24=0x0457;
Subpacket 18*d*: interlace field indication 21=0b0, video frame number 22=0x0, H-position 23=0x0000, V-position 24=0x045C;

Subpackets 18*a* to 18*d* of 57th Packet:
Subpacket 18*a*: interlace field indication 21=0b0, video frame number 22=0x0, H-position 23=0x0000, V-position 24=0x0461;
Subpacket 18*b*: interlace field indication 21=0b1, video frame number 22=0x0, H-position 23=0x0000, V-position 24=0x0466;
Subpacket 18*c*: interlace field indication 21=0b1, video frame number 22=0x0, H-position 23=0x0000, V-position 24=0x046B;
Subpacket 18*d*: interlace field indication 21=0b1, video frame number 22=0x0, H-position 23=0x0000, V-position 24=0x0470;
. . . ;

Subpackets 18*a* to 18*d* of 111st Packet:
Subpacket 18*a*: interlace field indication 21=0b1, video frame number 22=0x0, H-position 23=0x0000, V-position 24=0x0899;
Subpacket 18*b*: interlace field indication 21=0b1, video frame number 22=0x0, H-position 23=0x0000, V-position 24=0x089B;
Subpacket 18*c*: interlace field indication 21=0b1, video frame number 22=0x0, H-position 23=0x0000, V-position 24=0x08A3;
Subpacket 18*d*: interlace field indication 21=0b1, video frame number 22=0x0, H-position 23=0x0000, V-position 24=0x08A8;

Subpackets 18*a* to 10*d* of 112nd Packet:
Subpacket 18*a*: interlace field indication 21=0b1, video frame number 22=0x0, H-position 23=0x0000, V-position 24=0x08AD;
Subpacket 18*b*: interlace field indication 21=0b1, video frame number 22=0x0, H-position 23=0x0000, V-position 24=0x08B2;
Subpacket 18*c*: interlace field indication 21=0b0, video frame number 22=0x1, H-position 23=0x0000, V-position 24=0x0003;
Subpacket 18*d*: interlace field indication 21=0b0, video frame number 22=0x1, H-position 23=0x0000, V-position 24=0x0008
. . . ;

Subpackets 18*a* to 18*d* of 891st Packet:
Subpacket 18*a*: interlace field indication 21=0b1, video frame number 22=0x7, H-position 23=0x0000, V-position 24=0x089C;
Subpacket 18*b*: interlace field indication 21=0b1, video frame number 22=0x7, H-position 23=0x0000, V-position 24=0x08A1;
Subpacket 18*c*: interlace field indication 21=0b1, video frame number 22=0x7, H-position 23=0x0000, V-position 24=0x08A6;
Subpacket 18*d*: interlace field indication 21=0b1, video frame number 22=0x7, H-position 23=0x0000, V-position 24=0x08AB;

Subpackets 18*a* to 18*d* of 892nd Packet:
Subpacket 18*a*: interlace field indication 21=0b1, video frame number 22=0x7, H-position 23=0x0000, V-position 24=0x08B0;
Subpacket 18*b*: interlace field indication 21=0b0, video frame number 22=0x0, H-position 23=0x0000, V-position 24=0x0001;
Subpacket 18*c*: interlace field indication 21=0b0, video frame number 22=0x0, H-position 23=0x0000, V-position 24=0x0006;
Subpacket 18*d*: interlace field indication 21=0b0, video frame number 22=0x0, H-position 23=0x0000, V-position 24=0x000B; and sequences similar to above will subsequently follow.

In this case, it is assumed that the value 0b0 (unsupported) is stored in the partition index 20. In addition, it is assumed that there is no packet re-forwarding due to transmission errors.

As described above, the left-eye top field video frame data 151 of the first frame is transmitted in a form of packet in the first to 27th packets, the first interval and the blanking time interval 157 are transmitted in the 28th to 29th packets, and the right-eye top field video frame data 152 of the first frame is transmitted in a form of packet in the 29th to 56th packets. The second interval and the blanking time interval 158 are transmitted in the 56th to 57th packets, the left-eye bottom field video frame data 153 of the second frame is transmitted in a form of packet in the 58th to 84th packets, and the third interval and the blanking time interval 159 are transmitted in the 84th to 85th packets. The right-eye bottom field video frame data 154 of the second frame is transmitted in a form of packet in the 85th to 112nd packets, and the combined video frame data 155 and the combined video frame data 156 are transmitted in a form of packet by using 111 packets and two subpackets every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time intervals Th and the vertical position data for the vertical display time intervals Tv of the combined video frame data 155 obtained by combining the left-eye top field video frame data 151 with the right-eye top field video frame data 152 and the combined video frame data 156 obtained by combining the left-eye bottom field video frame data 153 with the right-eye bottom field video frame data 154 are stored in the H-position 23 and the V-position 24, respectively, as the data for identifying the left-eye top field video frame data 151, the right-eye top field video frame data 152, the left-eye bottom field video frame data 153 and the right-eye bottom field video frame data 154. Therefore, it is possible to identify the left-eye top field video frame data 151, the right-eye top field video frame data 152, the left-eye bottom field video frame data 153 and the right-eye bottom field video frame data 154 transmitted in a form of packet, and to efficiently transmit the AV contents data including the two-dimensional video data and the AV contents including the three-dimensional video data in the same packet format.

Eighth Preferred Embodiment

Figure 12:
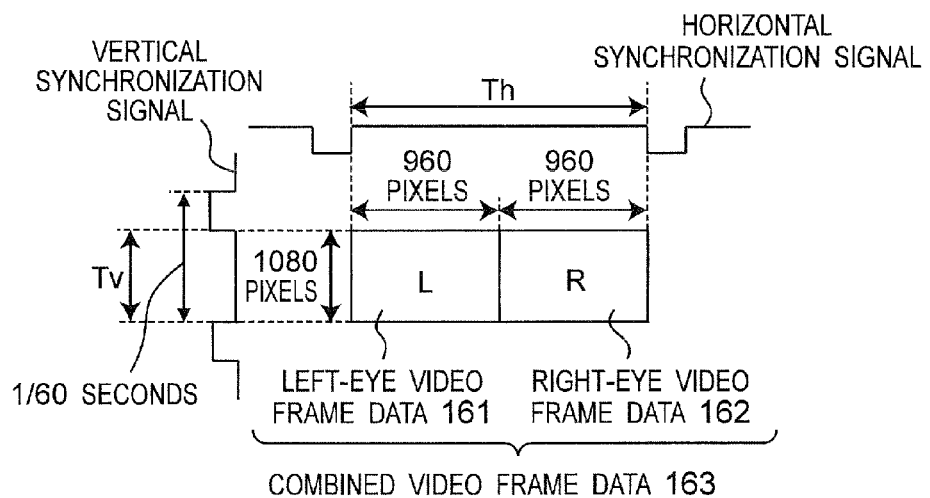
FIG. 12 is a data configuration diagram of combined video frame data 163 according to an eighth preferred embodiment of the present invention, where the diagram is shown based on a relation between the horizontal synchronization signal and the vertical synchronization signal.

FIG. 12 is a data configuration diagram of combined video frame data 163 according to an eighth preferred embodiment of the present invention, where the diagram is shown based on a relation between the horizontal synchronization signal and the vertical synchronization signal. The present preferred embodiment is different from the fifth preferred embodiment only in the generating method of the combined video frame data 163. The other points are similar to those of the fifth preferred embodiment, and therefore, no description of the operation is herein provided therefor.

FIG. 12 shows the format of the combined video frame data 163 when the VIC is 16 and the 3D structure represents side by side (half). Referring to FIG. 12, each of left-eye video frame data 161 and right-eye video frame data 162 has the number of horizontal active pixels of 960 pixels and the number of vertical active pixels of 1080 pixels. In addition, the combined video frame data 163 has the number of horizontal pixels of 1920 pixels and the number of vertical pixels of 1080 pixels. Further, the vertical synchronization frequency of the left-eye video frame data 161 and the right-eye video frame data 162 is 60 Hz. The packet processing circuit 113 combines the left-eye video frame data 161 with the right-eye video frame data 162 into the combined video frame data 163. In this case, for the vertical display time interval Tv, the left-eye video frame data 161 of 960 pixels is transmitted for the first half of the horizontal display time interval Th and the right-eye video frame data 162 of 960 pixels is transmitted for the latter half of the horizontal display time interval Th.

The source device 110 divides the combined video frame data 163 into a plurality of packets according to the packet format of FIG. 3, and wirelessly transmits the packets to the sink device 120. In this case, when the left-eye video frame data 161 is transmitted, the value stored in the H-position 23 is set to a value of 0x0000 to 0x03BF (0 to 959), and the value stored in the V-position 24 is set to a value of 0x0000 to 0x0438 (0 to 1079). On the other hand, when the right-eye video frame data 162 is transmitted, the value stored in the H-position 23 is set to a value of 0x03C0 to 0x077F (960 to 1919), and the value stored in the V-position 24 is set to a value of 0x0000 to 0x0438 (0 to 1079). It is noted that the values stored in the video frame numbers 22 corresponding to the left-eye video frame data 161 and the right-eye video frame data 162 in the same frame are set to be the same as each other.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:

Subpacket 18a: interlace field indication 21=0b0, video frame number 22=0x0, H-position 23=0x0000, V-position 24=0x0000;

Subpacket 18b: interlace field indication 21=0b0, video frame number 22=0x0, H-position 23=0x0000, V-position 24=0x0005;

Subpacket 18c: interlace field indication 21=0b0, video frame number 22=0x0, H-position 23=0x0000, V-position 24=0x000a;

Subpacket 18d: interlace field indication 21=0b0, video frame number 22=0x0, H-position 23=0x0000, V-position 24=0x000f;

Subpackets 18a to 18d of Second Packet:

Subpacket 18a: interlace field indication 21=0b0, video frame number 22=0x0, H-position 23=0x0000, V-position 24=0x0014;

Subpacket 18b: interlace field indication 21=0b0, video frame number 22=0x0, H-position 23=0x0000, V-position 24=0x0019;

Subpacket 18c: interlace field indication 21=0b0, video frame number 22=0x0, H-position 23=0x0000, V-position 24=0x001e;

Subpacket 18d: interlace field indication 21=0b0, video frame number 22=0x0, H-position 23=0x0000, V-position 24=0x0023;

. . . ;

Subpackets 18a to 18d of 54th Packet:

Subpacket 18a: interlace field indication 21=0b0, video frame number 22=0x0, H-position 23=0x0000, V-position 24=0x0424;

Subpacket 18b: interlace field indication 21=0b0, video frame number 22=0x0, H-position 23=0x0000, V-position 24=0x0429;

Subpacket 18c: interlace field indication 21=0b0, video frame number 22=0x0, H-position 23=0x0000, V-position 24=0x042E;

Subpacket 18*d*: interlace field indication 21=0b0, video frame number 22=0x0, H-position 23=0x0000, V-position 24=0x0433;

Subpackets 18*a* to 18*d* of 55th Packet:

Subpacket 18*a*: interlace field indication 21=0b0, video frame number 22=0x1, H-position 23=0x0000, V-position 24=0x0000;

Subpacket 18*b*: interlace field indication 21=0b0, video frame number 22=0x1, H-position 23=0x0000, V-position 24=0x0005;

Subpacket 18*c*: interlace field indication 21=0b0, video frame number 22=0x1, H-position 23=0x0000, V-position 24=0x000a;

Subpacket 18*d*: interlace field indication 21=0b0, video frame number 22=0x1, H-position 23=0x0000, V-position 24=0x000f;

. . . ;

Subpackets 18*a* to 18*d* of 432nd Packet:

Subpacket 18*a*: interlace field indication 21=0b0, video frame number 22=0x7, H-position 23=0x0000, V-position 24=0x0424;

Subpacket 18*b*: interlace field indication 21=0b0, video frame number 22=0x7, H-position 23=0x0000, V-position 24=0x0429;

Subpacket 18*c*: interlace field indication 21=0b0, video frame number 22=0x7, H-position 23=0x0000, V-position 24=0x042E;

Subpacket 18*d*: interlace field indication 21=0b0, video frame number 22=0x7, H-position 23=0x0000, V-position 24=0x0433;

Subpackets 18*a* to 18*d* of 433rd Packet:

Subpacket 18*a*: interlace field indication 21=0b0, video frame number 22=0x0, H-position 23=0x0000, V-position 24=0x0000;

Subpacket 18*b*: interlace field indication 21=0b0, video frame number 22=0x0, H-position 23=0x0780, V-position 24=0x0005;

Subpacket 18*c*: interlace field indication 21=0b0, video frame number 22=0x0, H-position 23=0x0000, V-position 24=0x000a;

Subpacket 18*d*: interlace field indication 21=0b0, video frame number 22=0x0, H-position 23=0x0780, V-position 24=0x000f; and sequences similar to above will subsequently follow.

In this case, it is assumed that the value 0b0 (unsupported) is stored in the partition index 20. In addition, it is assumed that there is no packet re-forwarding due to transmission errors.

The combined video frame data 163 is thus transmitted in a form of packet by using 54 packets every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Then, when the video data is the three-dimensional data, the horizontal position data for the horizontal display time interval Th and the vertical position data for the vertical display time interval Tv of the combined video frame data 163 obtained by combining the left-eye video frame data 161 with the right-eye video frame data 162 are stored in the H-position 23 and the V-position 24, respectively, as the data for identifying the left-eye video frame data 161 and the right-eye video frame data 162. Therefore, it is possible to identify the left-eye video frame data 161 and the right-eye video frame data 162 transmitted in a form of packet, and to efficiently transmit the AV contents data including the two-dimensional video data and the AV contents including the three-dimensional video data in the same packet format.

Ninth Preferred Embodiment

Figure 13:
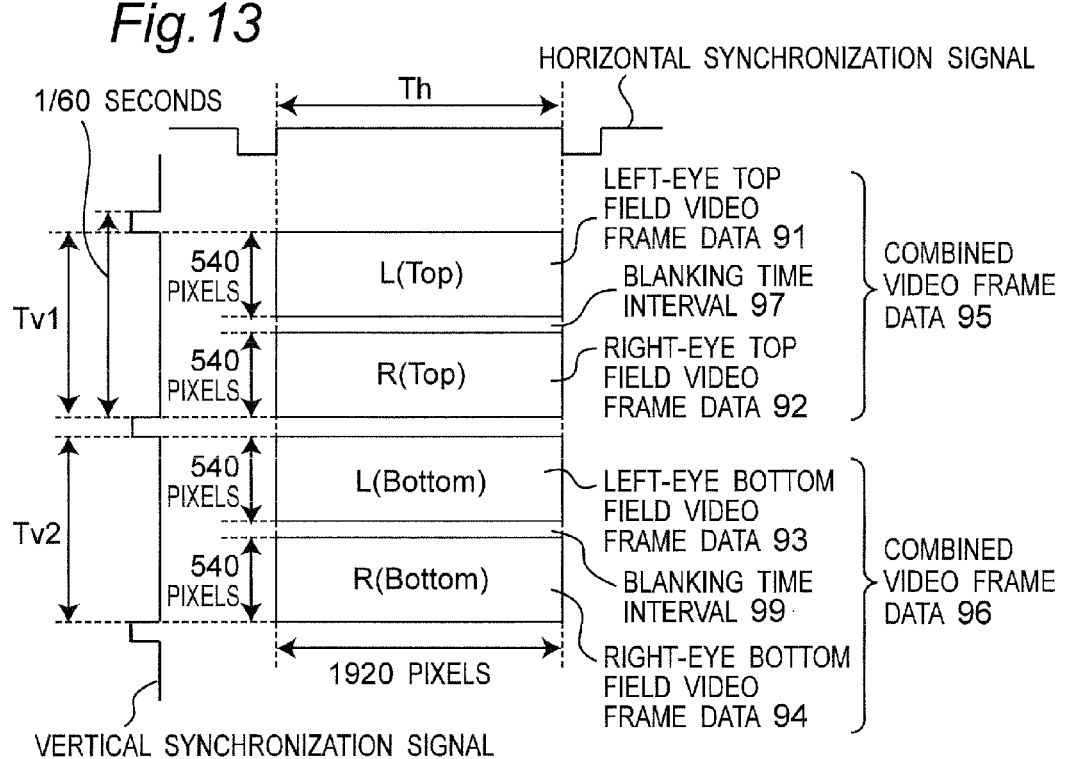
FIG. 13 is a data configuration diagram of combined video frame data 163 according to a ninth preferred embodiment of the present invention, where the diagram is shown based on a relation between the horizontal synchronization signal and the vertical synchronization signal.

FIG. 13 is a data configuration diagram of combined video frame data 163 according to a ninth preferred embodiment of the present invention, where the diagram is shown based on a relation between the horizontal synchronization signal and the vertical synchronization signal. The present preferred embodiment is different from the fifth preferred embodiment only in the generating method of the combined video frame data 95 and the combined video frame data 96. The other points are similar to those of the fifth preferred embodiment, and therefore, no description of the operation is herein provided therefor.

FIG. 13 shows the format of the combined video frame data 95 and the combined video frame data 96 when the VIC is 5 and the 3D structure represents frame alternative. Referring to FIG. 13, vertical display time intervals Tv1 and Tv2 are time intervals between three consecutive vertical synchronization intervals of the vertical synchronization signal. Referring to FIG. 13, each of left-eye top field video frame data 91, right-eye top field video frame data 92, left-eye bottom field video frame data 93 and right-eye bottom field video frame data 94 has the number of horizontal active pixels of 1920 pixels and the number of vertical active pixels of 540 pixels. In addition, each of the combined video frame data 95 and the combined video frame data 96 has the number of horizontal pixels of 1920 pixels and the number of vertical pixels of 1080 pixels. Further, the vertical synchronization frequency of the left-eye top field video frame data 91, the right-eye top field video frame data 92, the left-eye bottom field video frame data 93, and the right-eye bottom field video frame data 94 is 60 Hz. The packet processing circuit 113 combines the left-eye top field video frame data 91 with the right-eye top field video frame data 92 into the combined video frame data 95. In this case, the combined video frame data 95 is generated for the horizontal display time interval Th so that the left-eye top field video frame data 91 of 540 lines is transmitted for the first half of a vertical display time interval Tv1, and thereafter, the right-eye top field video frame data 92 of 540 lines is transmitted for the latter half of a vertical display time interval Tv1. In addition, a blanking time interval 97 is provided between the transmission time interval of the left-eye top field video frame data 91 and the transmission time interval of the right-eye top field video frame data 92. Further, the packet processing circuit 113 combines the left-eye bottom field video frame data 93 with the right-eye bottom field video frame data 94 into the combined video frame data 96. In this case, the combined video frame data 96 is generated for the horizontal display time interval Th so that the left-eye bottom field video frame data 93 of 540 lines is transmitted for the first half of the vertical display time interval Tv2, and thereafter, the right-eye bottom field video frame data 94 of 540 lines is transmitted for the latter half of the vertical display time interval Tv2. In addition, a blanking time interval 99 is provided between the transmission time interval of the left-eye bottom field video frame data 93 and the transmission time interval of the right-eye bottom field video frame data 94.

The source device 110 divides the combined video frame data 95 and the combined video frame data 96 into a plurality of packets according to the packet format of FIG. 3, and wirelessly transmits the packets to the sink device 120. In this case, when the left-eye top field video frame data 91 or the left-eye bottom field video frame data 93 is transmitted, the value stored in the H-position 23 is set to a value of 0x0000 to 0x077F (0 to 1919), and the value stored in the V-position 24 is set to a value of 0x0000 to 0x021B (0 to 539). In addition, when the right-eye top field video frame data 92 or the right-eye bottom field video frame data 94 is transmitted, the value stored in the H-position 23 is set to a value of 0x0000 to 0x077F (0 to 1919), and the value stored in the V-position 24 is set to a value of 0x0233 to 0x044E (563 to 1102). In addition, when the first interval, the blanking time interval 97, the third interval and the blanking time interval 99 are transmitted, the value stored in the H-position 23 is set to a value of 0x0000 to 0x077F (0 to 1919), and the value stored in the V-position 24 is set to a value of 0x021C to 0x0232 (540 to 562). It is noted that the values stored in the video frame numbers 22 corresponding to the left-eye top field video frame data 91 and the right-eye top field video frame data 92 in the same frame are set to the same odd number value. The values stored in the video frame numbers 22 corresponding to the left-eye bottom field video frame data 93 and the right-eye bottom field video frame data 94 in the same frame are set to the same even number value.

In this case, as one example, it is assumed that the packet body 15 includes the subpacket 18*a* to the subpacket 18*d*, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17*a*, 17*b*, 17*c* and 17*d* provided so as to correspond to each subpacket are set as follows, and are sequentially transmitted.

Subpackets 18*a* to 18*d* of First Packet:

Subpacket 18*a*: interlace field indication 21=0b0, video frame number 22=0x0, H-position 23=0x0000, V-position 24=0x0000;

Subpacket 18*b*: interlace field indication 21=0b0, video frame number 22=0x0, H-position 23=0x0000, V-position 24=0x0005;

Subpacket 18*c*: interlace field indication 21=0b0, video frame number 22=0x0, H-position 23=0x0000, V-position 24=0x000a;

Subpacket 18*d*: interlace field indication 21=0b0, video frame number 22=0x0, H-position 23=0x0000, V-position 24=0x000f;

Subpackets 18*a* to 18*d* of Second Packet:

Subpacket 18*a*: interlace field indication 21=0b0, video frame number 22=0x0, H-position 23=0x0000, V-position 24=0x0014;

Subpacket 18*b*: interlace field indication 21=0b0, video frame number 22=0x0, H-position 23=0x0780, V-position 24=0x0019;

Subpacket 18*c*: interlace field indication 21=0b0, video frame number 22=0x0, H-position 23=0x0000, V-position 24=0x001e;

Subpacket 18*d*: interlace field indication 21=0b0, video frame number 22=0x0, H-position 23=0x0780, V-position 24=0x0023;

. . . ;

Subpackets 18*a* to 18*d* of 55th Packet:

Subpacket 18*a*: interlace field indication 21=0b0, video frame number 22=0x0, H-position 23=0x0000, V-position 24=0x0438;

Subpacket 18*b*: interlace field indication 21=0b0, video frame number 22=0x0, H-position 23=0x0000, V-position 24=0x043D;

Subpacket 18*c*: interlace field indication 21=0b0, video frame number 22=0x0, H-position 23=0x0000, V-position 24=0x0442;

Subpacket 18*d*: interlace field indication 21=0b0, video frame number 22=0x0, H-position 23=0x0000, V-position 24=0x0447;

Subpackets 18*a* to 18*d* of 56th Packet:

Subpacket 18*a*: interlace field indication 21=0b0, video frame number 22=0x0, H-position 23=0x0000, V-position 24=0x044C;

Subpacket 18*b*: interlace field indication 21=0b1, video frame number 22=0x0, H-position 23=0x0000, V-position 24=0x0002;

Subpacket 18*c*: interlace field indication 21=0b1, video frame number 22=0x0, H-position 23=0x0000, V-position 24=0x0007;

Subpacket 18*d*: interlace field indication 21=0b1, video frame number 22=0x0, H-position 23=0x0000, V-position 24=0x000C;

. . . ;

Subpackets 18*a* to 18*d* of 110th Packet:

Subpacket 18*a*: interlace field indication 21=0b1, video frame number 22=0x0, H-position 23=0x0000, V-position 24=0x0435;

Subpacket 18*b*: interlace field indication 21=0b1, video frame number 22=0x0, H-position 23=0x0000, V-position 24=0x043A;

Subpacket 18*c*: interlace field indication 21=0b1, video frame number 22=0x0, H-position 23=0x0000, V-position 24=0x043F;

Subpacket 18*d*: interlace field indication 21=0b1, video frame number 22=0x0, H-position 23=0x0000, V-position 24=0x0444;

Subpackets 18*a* to 18*d* of 111st Packet:

Subpacket 18*a*: interlace field indication 21=0b1, video frame number 22=0x0, H-position 23=0x0000, V-position 24=0x0449;

Subpacket 18*b*: interlace field indication 21=0b1, video frame number 22=0x0, H-position 23=0x0000, V-position 24=0x044E;

Subpacket 18*c*: interlace field indication 21=0b0, video frame number 22=0x1, H-position 23=0x0000, V-position 24=0x0004;

Subpacket 18*d*: interlace field indication 21=0b0, video frame number 22=0x1, H-position 23=0x0000, V-position 24=0x0009;

. . . ;

Subpackets 18*a* to 18*d* of 882nd Packet:

Subpacket 18*a*: interlace field indication 21=0b1, video frame number 22=0x7, H-position 23=0x0000, V-position 24=0x0432;

Subpacket 18*b*: interlace field indication 21=0b1, video frame number 22=0x7, H-position 23=0x0000, V-position 24=0x0438;

Subpacket 18c: interlace field indication 21=0b1, video frame number 22=0x7, H-position 23=0x0000, V-position 24=0x043D;

Subpacket 18d: interlace field indication 21=0b1, video frame number 22=0x7, H-position 23=0x0000, V-position 24=0x0442;

Subpackets 18a to 18d of 883rd Packet:

Subpacket 18a: interlace field indication 21=0b1, video frame number 22=0x7, H-position 23=0x0000, V-position 24=0x0447;

Subpacket 18b: interlace field indication 21=0b1, video frame number 22=0x7, H-position 23=0x0000, V-position 24=0x044C;

Subpacket 18c: interlace field indication 21=0b0, video frame number 22=0x0, H-position 23=0x0000, V-position 24=0x0002;

Subpacket 18d: interlace field indication 21=0b0, video frame number 22=0x0, H-position 23=0x0000, V-position 24=0x0007; and sequences similar to above will subsequently follow.

In this case, it is assumed that the value 0b0 (unsupported) is stored in the partition index 20. In addition, it is assumed that there is no packet re-forwarding due to transmission errors.

As described above, the left-eye top field video frame data 91 of the first frame is transmitted in a form of packet in the first to 27th packets, the first interval and the blanking time interval 97 are transmitted in a form of packet in the 28th to 29th packets, and the right-eye top field video frame data 92 of the first frame is transmitted in a form of packet in the 29th to 56th packets. The left-eye bottom field video frame data 93 of the second frame is transmitted in a form of packet in the 56th to 83rd packets, and the third interval and the blanking time interval 99 are transmitted in the 83rd to 84th packets. The right-eye bottom field video frame data 94 of the second frame is transmitted in the 84th to 111st packets, and the combined video frame data 95 and the combined video frame data 96 are transmitted in a form of packet by using 55 packets and one subpacket every video frame.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position for the vertical display time interval Tv of the combined video frame data 95 obtained by combining the left-eye top field video frame data 91 with the right-eye top field video frame data 92 and the combined video frame data 96 obtained by combining the left-eye bottom field video frame data 93 with the right-eye bottom field video frame data 94 are stored in the H-position 23 and the V-position 24, respectively, as the data for identifying the left-eye top field video frame data 91, the right-eye top field video frame data 92, the left-eye bottom field video frame data 93 and the right-eye bottom field video frame data 94. Therefore, it is possible to identify the left-eye top field video frame data 91, the right-eye top field video frame data 92, the left-eye bottom field video frame data 93 and the right-eye bottom field video frame data 94 transmitted in a form of packet, and to efficiently transmit the AV contents data including the two-dimensional video data and the AV contents including the three-dimensional video data in the same packet format.

Tenth Preferred Embodiment

Figure 14:
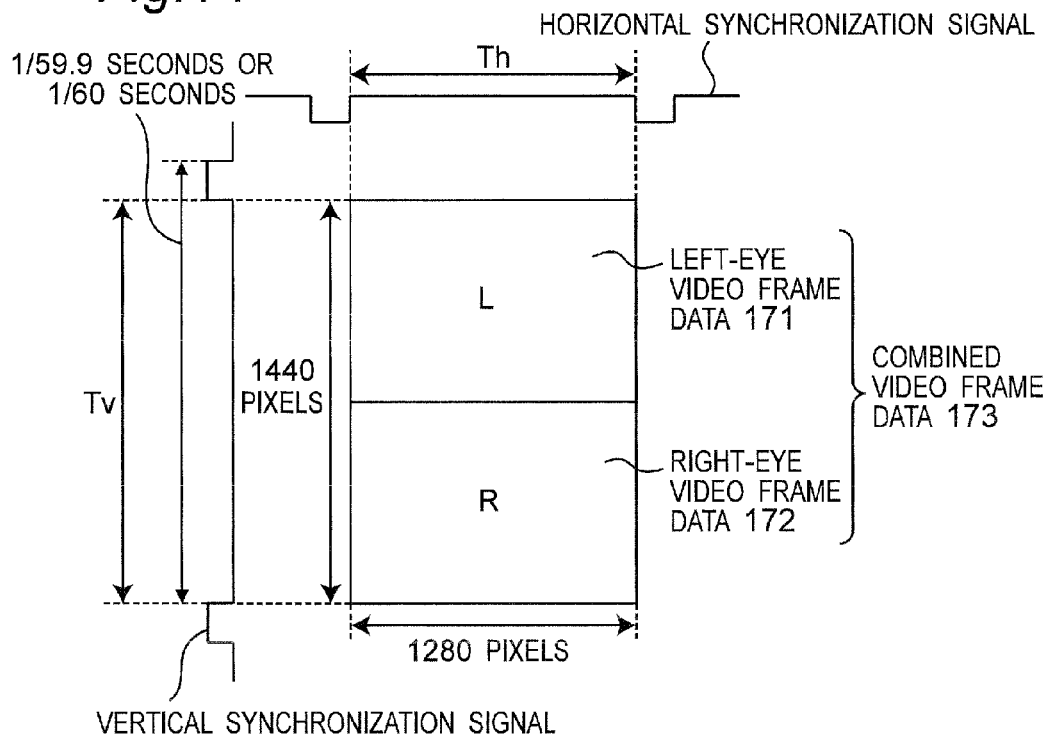
FIG. 14 is a data configuration diagram of combined video frame data 173 according to a tenth preferred embodiment of the present invention, where the diagram is shown based on a relation between the horizontal synchronization signal and the vertical synchronization signal.

FIG. 14 is a data configuration diagram of combined video frame data 173 according to a tenth preferred embodiment of the present invention, where the diagram is shown based on a relation between the horizontal synchronization signal and the vertical synchronization signal. In addition, FIGS. 15 to 16 show each of VIC tables 115t and 127t of the tenth preferred embodiment of the present invention. The present preferred embodiment is different from the first preferred embodiment only in the size of the combined video frame data 173 and the VIC values allocated in the VIC tables 115t and 127t. The other points are similar to those of the first preferred embodiment, and therefore, no description of the operation is herein provided therefor.

In the present preferred embodiment, the source device 110 and the sink device 120 previously store the VIC tables 115t and 127t, which include the video format identification codes for identifying the plurality of video formats of the two-dimensional data and the plurality of video formats of the three-dimensional data in memories 115 and 127, respectively. Concretely speaking, the VICs of 96 to 99 are allocated to each of the video formats of the three-dimensional data including the right-eye video frame data 172 and the left-eye video frame data 171 as shown in FIG. 15 to FIG. 16. The VIC of 96 is allocated to a video format, in which the combined video frame data 173 has the numbers of horizontal and vertical pixels of 1920×2160 (the left-eye video frame data 171 has the numbers of horizontal and vertical pixels of 1920×1080, and the right-eye video frame data 172 has the numbers of horizontal and vertical pixels of 1920×1080). In addition, the scanning method is progressive scan, the vertical synchronization frequency is 23.97/24 Hz, and a frame sequential system is used. In addition, the VIC of 97 is allocated to a video format, in which the combined video frame data 173 has the numbers of horizontal and vertical pixels of 1920×2160 (the left-eye video frame data 171 has the numbers of horizontal and vertical pixels of 1920×1080, and the right-eye video frame data 172 has the numbers of horizontal and vertical pixels of 1920×1080). In addition, the scanning method is progressive scan, the vertical synchronization frequency is 25 Hz, and the frame sequential system is used. Further, the VIC of 98 is allocated to a video format, in which the combined video frame data 173 has the number of horizontal and vertical pixels of 1280×1440 (the left-eye video frame data 171 has the numbers of horizontal and vertical pixels of 1280×720, and the right-eye video frame data 172 has the horizontal and vertical pixels of 1280×720). In addition, the scanning method is progressive scan, the vertical synchronization frequency is 59.94/60 Hz, and the frame sequential system is used. Still further, the VIC of 99 is allocated to a video format, in which the combined video frame data 173 has the numbers of horizontal vertical pixels of 1280×1440 (the left-eye video frame data 171 has the numbers of horizontal and vertical pixels of 1280×720, and the right-eye video frame data 172 has the numbers of horizontal and vertical pixels of 1280×720). In addition, the scanning method is progressive scan, the vertical synchronization frequency is 50 Hz, and the frame sequential system is used.

The other VICs are allocated to a plurality of two-dimensional video formats and reserved regions (auxiliary).

FIG. 14 shows the format of the combined video frame data 173 when the VIC is 98. Referring to FIG. 14, each of the left-eye video frame data 171 and the right-eye video frame data 172 has the number of horizontal active pixels of 1280 pixels and the number of vertical active pixels of 720 pixels. In addition, the combined video frame data 173 has the number of horizontal pixels of 1280 pixels and the number of vertical pixels of 1440 pixels. Further, the vertical synchronization frequency of the left-eye video frame data 171 and the right-eye video frame data 172 is 59.94 Hz or 60 Hz. The packet processing circuit 113 combines the left-eye video frame data 171 with the right-eye video frame data 172 into the combined video frame data 173. In this case, the combined video frame data 173 is generated for the horizontal display time interval Th so that the left-eye video frame data 171 of 720 lines is transmitted for the first half of the vertical display time interval Tv, and thereafter, the right-eye video frame data 172 of 720 lines is transmitted for the latter half of the vertical display time interval Tv. The source device 110 divides the combined video frame data 173 into a plurality of packets according to the packet format of FIG. 3, and wirelessly transmits the packets to the sink device 120.

In this case, as one example, it is assumed that the packet body 15 includes the subpacket 18a to the subpacket 18d, and the video data of five lines in the vertical direction (i.e., video data of 5×1280=6400 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f;

Subpackets 18a to 18d of Second Packet:
Subpacket 18a: interlace field indication 21=0b0, video frame number 22=0x0, H-position 23=0x0000, V-position 24=0x0014;
Subpacket 18b: interlace field indication 21=0b0, video frame number 22=0x0, H-position 23=0x0000, V-position 24=0x0019;
Subpacket 18c: interlace field indication 21=0b0, video frame number 22=0x0, H-position 23=0x0000, V-position 24=0x001e;
Subpacket 18d: interlace field indication 21=0b0, video frame number 22=0x0, H-position 23=0x0000, V-position 24=0x0023;

. . . ;

Subpackets 18a to 18d of 72nd Packet:
Subpacket 18a: interlace field indication 21=0b0, video frame number 22=0x0, H-position 23=0x0000, V-position 24=0x058c;
Subpacket 18b: interlace field indication 21=0b0, video frame number 22=0x0, H-position 23=0x0000, V-position 24=0x0591;
Subpacket 18c: interlace field indication 21=0b0, video frame number 22=0x0, H-position 23=0x0000, V-position 24=0x0596;
Subpacket 18d: interlace field indication 21=0b0, video frame number 22=0x0, H-position 23=0x0000, V-position 24=0x059b;

Subpackets 18a to 18d of 73rd Packet:
Subpacket 18a: interlace field indication 21=0b0, video frame number 22=0x1, H-position 23=0x0000, V-position 24=0x0000;
Subpacket 18b: interlace field indication 21=0b0, video frame number 22=0x1, H-position 23=0x0000, V-position 24=0x0005;
Subpacket 18c: interlace field indication 21=0b0, video frame number 22=0x1, H-position 23=0x0000, V-position 24=0x000a;
Subpacket 18d: interlace field indication 21=0b0, video frame number 22=0x1, H-position 23=0x0000, V-position 24=0x000f;

. . . ;

Subpackets 18a to 18d of 576th Packet:
Subpacket 18a: interlace field indication 21=0b0, video frame number 22=0x7, H-position 23=0x0000, V-position 24=0x058c;
Subpacket 18b: interlace field indication 21=0b0, video frame number 22=0x7, H-position 23=0x0000, V-position 24=0x0591;
Subpacket 18c: interlace field indication 21=0b0, video frame number 22=0x7, H-position 23=0x0000, V-position 24=0x0596;
Subpacket 18d: interlace field indication 21=0b0, video frame number 22=0x7, H-position 23=0x0000, V-position 24=0x059b Subpackets 18a to 18d of 577th Packet:
Subpacket 18a: interlace field indication 21=0b0, video frame number 22=0x0, H-position 23=0x0000, V-position 24=0x0000;
Subpacket 18b: interlace field indication 21=0b0, video frame number 22=0x0, H-position 23=0x0000, V-position 24=0x0005;
Subpacket 18c: interlace field indication 21=0b0, video frame number 22=0x0, H-position 23=0x0000, V-position 24=0x000a;
Subpacket 18d: interlace field indication 21=0b0, video frame number 22=0x0, H-position 23=0x0000, V-position 24=0x000f; and sequences similar to above will subsequently follow.

In this case, it is assumed that the value 0b0 (unsupported) is stored in the partition index 20. In addition, it is assumed that there is no packet re-forwarding due to transmission errors.

The combined video frame data 173 is thus transmitted in a form of packet by using 72 packets every video frame. The values stored in the video frame numbers 22 of the left-eye video frame data 171 and the right-eye video frame data 172 are set to be the same as each other. In addition, when the left-eye video frame data 171 is transmitted, the value stored in the H-position 23 is set to a value of 0x0000 to 0x04FF (0 to 1279), and the value stored in the V-position 24 is set to a value of 0x0000 to 0x02CF (0 to 719). Further, when the right-eye video frame data 172 is transmitted, the value stored in the H-position 23 is set to a value of 0x0000 to 0x04FF (0 to 1279), and the value stored in the V-position 24 is set to a value of 0x02D0 to 0x059F (720 to 1439).

When the VIC value is 98 or 99 (see FIG. 15 to FIG. 16), the number of horizontal pixels is 1280, and the number of vertical pixels is 1440 pixels. In this case, the values stored in the video controls 17a, 17b, 17c and 17d are set as follows.

(a) The value stored in the video frame number 22 of the left-eye video frame data 171 and the value stored in the video frame number 22 of the right-eye video frame data 172 are set to the same value.

(b) The value stored in the H-position 23 for the left-eye video frame data 171 and the value stored in the H-position 23 for the right-eye video frame data 172 are set to a value of 0 to 1279.

(c) The value stored in the V-position 24 for the left-eye video frame data 171 is set to a value of 0 to 719, and the value stored in the V-position 24 for the right-eye video frame data 172 is set to a value of 720 to 1439.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position data for the vertical display time interval Tv of the combined video frame data 173 obtained by combining the left-eye top field video frame data 171 with the right-eye top field video frame data 172 are stored in the H-position 23 and the V-position 24, respectively, as the data for identifying the left-eye top field video frame data 171 and the right-eye video frame data 172. Therefore, the sink device 120 can identify the left-eye top field video frame data 171 when the value stored in the V-position 24 of the received packet is within a range of 0 to 719, and can identify the right-eye video frame data 172 when the value stored in the V-position 24 is within a range of 720 to 1439. Therefore, it is possible to efficiently transmit the AV contents data including the two-dimensional video data and the AV contents including the three-dimensional video data in the same packet format.

In the present preferred embodiment, the values stored in the V-positions 24 for the left-eye video frame data 171 and the right-eye video frame data 172 are set to a value within the range of the consecutive values of 0 to 1439, however, the present invention is not limited to this. It is acceptable to set the value stored in each V-position 24 for the left-eye video frame data 171 to a value of 0 to 719, provide a blanking time interval (space) of 30 lines, and set the value of each V-position 24 for the right-eye video frame data 172 to a value of 750 to 1496 instead of values continuous to those for the left-eye video frame data 171. Further, it is acceptable to transmit data other than the video data, such as audio data or dummy data, for the blanking time interval.

Eleventh Preferred Embodiment

Figure 17:
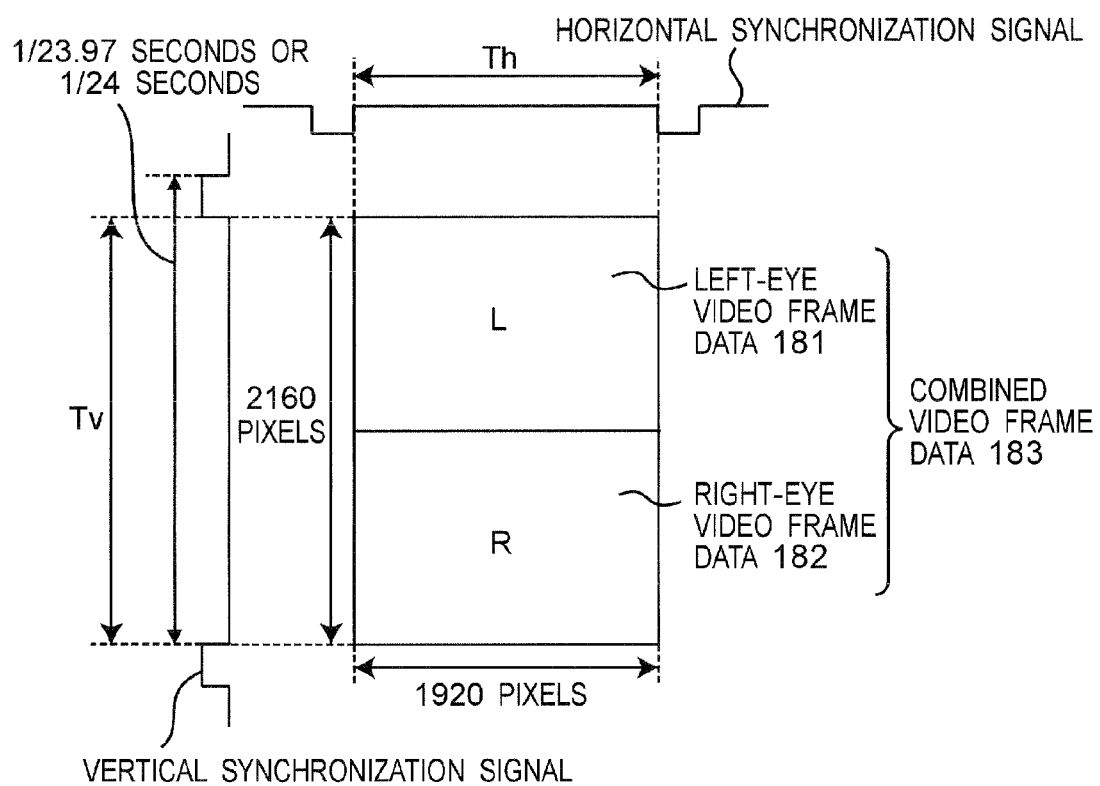
FIG. 17 is a data configuration diagram of combined video frame data 183 according to an eleventh preferred embodiment of the present invention, where the diagram is shown based on a relation between the horizontal synchronization signal and the vertical synchronization signal.

FIG. 17 is a data configuration diagram of combined video frame data 183 according to an eleventh preferred embodiment of the present invention, where the diagram is shown based on a relation between the horizontal synchronization signal and the vertical synchronization signal. The present preferred embodiment is different from the tenth preferred embodiment only in the number of horizontal pixels, the number of vertical pixels and the vertical synchronization frequency of the combined video frame data 183. The other points are similar to those of the tenth preferred embodiment, and therefore, no description of the operation is herein provided therefor.

FIG. 17 shows the format of the combined video frame data 183 when the VIC is 96. Referring to FIG. 17, each of left-eye video frame data 181 and right-eye video frame data 182 has the number of horizontal active pixels of 1920 pixels and the number of vertical active pixels of 1080 pixels. In addition, the combined video frame data 183 has the number of horizontal pixels of 1920 pixels and the number of vertical pixels of 2160 pixels. Further, the vertical synchronization frequency of the left-eye video frame data 181 and the right-eye video frame data 182 is 23.97 Hz or 24 Hz. The packet processing circuit 113 combines the left-eye video frame data 181 with the right-eye video frame data 182 into the combined video frame data 183. In this case, the combined video frame data 183 is generated for the horizontal display time interval Th so that the left-eye video frame data 181 of 1080 lines is transmitted for the first half of the vertical display time interval Tv, and the right-eye video frame data 182 of 1080 lines is transmitted for the latter half of the vertical display time interval Tv. The source device 110 divides the combined video frame data 183 into a plurality of packets according to the packet format of FIG. 3, and wirelessly transmits the packets to the sink device 120.

In this case, as one example, it is assumed that the packet body 15 includes the subpacket 18a to the subpacket 18d, and the video data of five lines in the vertical direction (i.e., video data of 5×1920=9600 pixels) are packed in each subpacket. In this case, the values to be stored in the interlace field indication 21, the video frame number 22, the H-position 23 and the V-position 24 in the video controls 17a, 17b, 17c and 17d provided so as to correspond to each subpacket are set as follows, and are sequentially transmitted.

Subpackets 18a to 18d of First Packet:

Subpacket 18a: interlace field indication 21=0b0, video frame number 22=0x0, H-position 23=0x0000, V-position 24=0x0000;

Subpacket 18b: interlace field indication 21=0b0, video frame number 22=0x0, H-position 23=0x0000, V-position 24=0x0005;

Subpacket 18c: interlace field indication 21=0b0, video frame number 22=0x0, H-position 23=0x0000, V-position 24=0x000a;

Subpacket 18d: interlace field indication 21=0b0, video frame number 22=0x0, H-position 23=0x0000, V-position 24=0x000f;

Subpackets 18a to 18d of Second Packet:

Subpacket 18a: interlace field indication 21=0b0, video frame number 22=0x0, H-position 23=0x0000, V-position 24=0x0014;

Subpacket 18b: interlace field indication 21=0b0, video frame number 22=0x0, H-position 23=0x0000, V-position 24=0x0019;

Subpacket 18c: interlace field indication 21=0b0, video frame number 22=0x0, H-position 23=0x0000, V-position 24=0x001e;

Subpacket 18*d*: interlace field indication 21=0b0, video frame number 22=0x0, H-position 23=0x0000, V-position 24=0x0023;

. . . ;

Subpackets 18*a* to 18*d* of 108th Packet:

Subpacket 18*a*: interlace field indication 21=0b0, video frame number 22=0x0, H-position 23=0x0000, V-position 24=0x085c;

Subpacket 18*b*: interlace field indication 21=0b0, video frame number 22=0x0, H-position 23=0x0000, V-position 24=0x0861;

Subpacket 18*c*: interlace field indication 21=0b0, video frame number 22=0x0, H-position 23=0x0000, V-position 24=0x0866;

Subpacket 18*d*: interlace field indication 21=0b0, video frame number 22=0x0, H-position 23=0x0000, V-position 24=0x086b;

Subpackets 18*a* to 18*d* of 109th Packet:

Subpacket 18*a*: interlace field indication 21=0b0, video frame number 22=0x1, H-position 23=0x0000, V-position 24=0x0000;

Subpacket 18*b*: interlace field indication 21=0b0, video frame number 22=0x1, H-position 23=0x0000, V-position 24=0x0005;

Subpacket 18*c*: interlace field indication 21=0b0, video frame number 22=0x1, H-position 23=0x0000, V-position 24=0x000a;

Subpacket 18*d*: interlace field indication 21=0b0, video frame number 22=0x1, H-position 23=0x0000, V-position 24=0x000f;

. . . ;

Subpackets 18*a* to 18*d* of 864th Packet:

Subpacket 18*a*: interlace field indication 21=0b0, video frame number 22=0x7, H-position 23=0x0000, V-position 24=0x085c;

Subpacket 18*b*: interlace field indication 21=0b0, video frame number 22=0x7, H-position 23=0x0000, V-position 24=0x0861;

Subpacket 18*c*: interlace field indication 21=0b0, video frame number 22=0x7, H-position 23=0x0000, V-position 24=0x0866;

Subpacket 18*d*: interlace field indication 21=0b0, video frame number 22=0x7, H-position 23=0x0000, V-position 24=0x086b;

Subpackets 18*a* to 18*d* of 865th Packet:

Subpacket 18*a*: interlace field indication 21=0b0, video frame number 22=0x0, H-position 23=0x0000, V-position 24=0x0000;

Subpacket 18*b*: interlace field indication 21=0b0, video frame number 22=0x0, H-position 23=0x0000, V-position 24=0x0005;

Subpacket 18*c*: interlace field indication 21=0b0, video frame number 22=0x0, H-position 23=0x0000, V-position 24=0x000a;

Subpacket 18*d*: interlace field indication 21=0b0, video frame number 22=0x0, H-position 23=0x0000, V-position 24=0x000f; and sequences similar to above will subsequently follow.

In this case, it is assumed that the value 0b0 (unsupported) is stored in the partition index 20. In addition, it is assumed that there is no packet re-forwarding due to transmission errors.

The combined video frame data 183 is thus transmitted in a form of packet by using 108 packets every video frame. The values stored in the video frame numbers 22 for the left-eye video frame data 181 and the right-eye video frame data 182 are set to the same value. In addition, when the left-eye video frame data 181 is transmitted, the value stored in the H-position 23 is set to a value of 0x0000 to 0x077F (0 to 1919), and the value stored in the V-position 24 is set to a value of 0x0000 to 0x0437 (0 to 1079). On the other hand, when the right-eye video frame data 182 is transmitted, the value stored in the H-position 23 is set to a value of 0x0000 to 0x077F (0 to 1919), and the value stored in the V-position 24 is set to a value of 0x0438 to 0x086F (1080 to 2159).

When the VIC value is 96 or 97 (see FIG. 15 to FIG. 16), the number of horizontal pixels is 1920, and the number of vertical pixels is 2160 pixels. In this case, the values stored in the video controls 17*a*, 17*b*, 17*c* and 17*d* are set as follows.

(a) The value stored in the video frame number 22 of the left-eye video frame data 181 and the value stored in the video frame number 22 of the right-eye video frame data 182 are set to the same value.

(b) The value stored in the H-position 23 for the left-eye video frame data 181 and the value stored in the H-position 23 for the right-eye video frame data 182 are set to a value of 0 to 1919.

(c) The value stored in the V-position 24 for the left-eye video frame data 181 is set to a value of 0 to 1079, and the value stored in the V-position 24 for the right-eye video frame data 182 is set to a value of 1080 to 2159.

As described above, according to the present preferred embodiment, in the network for transmitting the AV contents data including the video data and the audio data from the source device 110 to the sink device 120, the header of each packet for packet transmission of uncompressed video data includes the partition index 20 for storing the division information on the pixel data stored in the packet, the interlace field indication 21 for storing the data to identify the top and the bottom of the interlace signal, the video frame number 22 for storing the video frame number of the pixel data stored in the packet, the H-position 23 for storing the information on the horizontal position of the first pixel of the video data stored in the packet, and the V-position 24 for storing the information on the vertical position of the first pixel of the video data stored in the packet. Further, when the video data is the three-dimensional data, the horizontal position data for the horizontal display time interval Th and the vertical position for the vertical display time interval Tv of the combined video frame data 183 obtained by combining the left-eye video frame data 181 with the right-eye video frame data 182 are stored in the H-position 23 and the V-position 24, respectively, as the data for identifying the left-eye video frame data 181 and the right-eye video frame data 182. Therefore, the sink device 120 can identify the left-eye video frame data 181 when the value stored in the V-position 24 of the received packet is within the range of 0 to 1079, and can identify the right-eye video frame data 182 when the value stored in the V-position 24 is within the range of 1080 to 2159. Therefore, it is possible to efficiently transmit the AV contents data including the two-dimensional video data and the AV contents including the three-dimensional video data in the same packet format.

In the present preferred embodiment, the value stored in the V-positions 24 for the left-eye video frame data 181 and the right-eye video frame data 182 are set to values within the range of the consecutive values of 0 to 2159, however, the present invention is not limited to this. It is acceptable to set the value of the V-position 24 for the left-eye video frame data 181 to, for example, a value of 0 to 1079, provide a blanking time interval (space) of 45 lines, and set the value of the V-position 24 for the right-eye video frame data 182 to a value of 1125 to 2204 values continuous to those for the left-eye video frame data 181. Further, it is acceptable to transmit data other than the video data, such as audio data or dummy data, for the blanking time interval.

In the above first to ninth preferred embodiments, the VIC value may be another VIC value of, for example, 4 (720p/59.94 Hz) or 19 (720p/50 Hz). In addition, the output specifications (video format) of the video data allocated to the VIC value and each VIC in each of the preferred embodiments are mere one example, and may be those other than the VIC and output specifications described above.

In addition, in each of the fifth to ninth preferred embodiments, the 3D structure represents the frame packing, the side by side (full), the side by side (half) or the frame alternative, however, may represent other video structures such as line alternative, L+depth, and L+depth+Gfx+G-depth.

In addition, the video data of five lines in the vertical direction (i.e., video data of 5×1920=9600 pixels) are packed in the subpacket 18a to the subpacket 18d in the above-described preferred embodiments, however, the number of lines of the video data stored in one subpacket may be a value other than five.

Further, the packet body 15 includes the subpacket 18a to the subpacket 18d in the above-described preferred embodiments, however, the number of the subpackets of the video data may be another value so long as it is equal to or smaller than four.

Still further, in the above-described preferred embodiments, the source device 110 may notify the sink device 120 of the format information for identifying which of the two-dimensional data and the three-dimensional data the video data is, by inserting the information in a predetermined control command such as the stream start notification command, and the sink device 120 may decode the packets of the video data from the source device 110 according to the notified format information.

In addition, the source device 110 is wirelessly connected to the sink device 120 via a wireless transmission path compliant with the wireless HD in the above preferred embodiments, however, the present invention is not limited to this. The source device 110 may be connected to the sink device 120 via a wired transmission cable or a wireless transmission path compliant with a wireless communication standard other than the wireless HD. In this case, when the video data to be transmitted is the three-dimensional data including the first video frame data and the second video frame data, the source device 110 combines the first video frame data with the second video frame data into the combined video frame data every video frame, generates a plurality of packets by dividing the combined video frame data into the plurality of packets according to a predetermined packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data, and transmits the plurality of packets to the sink device 120. In addition, the sink device 120 identifies the first video frame data and the second video frame data based on the information on the horizontal position and the information on the vertical position inserted into the packet of the video data from the source device 110.

Further, the bandwidth management unit 121b is provided for the controller 121 of the sink device 120 in the above-described preferred embodiments, however, the present invention is not limited to this. The bandwidth management unit 121b may be provided for the controller 111 of the source device 110 or another device.

Still further, in the above-described preferred embodiments, the H-position 23 stores the horizontal position data for the horizontal display time interval Th and the V-position 24 stores the vertical position data for the vertical display time interval Tv, however, the present invention is not limited to this. The H-position 23 may store information on the horizontal position for the horizontal display time interval Th, and the V-position 24 may store information on the vertical position for the vertical display time interval Tv.

INDUSTRIAL APPLICABILITY

As described above in detail, according to the source device, the sink device, the communication system and the video data packet transmitting method of the present invention, when the video data is three-dimensional data including first video frame data and second video frame data, the source device combines the first video frame data with the second video frame data into combined video frame data every video frame, generates a plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data. The sink device receives transmitted packets, and identifies the first video frame data and the second video frame data based on the information on the horizontal position and the information on the vertical position inserted into a plurality of received packets. Therefore, it is possible to transmit the video data of the three-dimensional data in real time. In particular, it is possible to efficiently transmit AV contents data including the video data of two-dimensional data and the video data of three-dimensional data by using the packet format of the video data of the prior art wireless HD.

The present invention can be particularly used for, for example, transmission of the uncompressed AV contents data in a wireless communication system compliant with a wireless communication standard such as the wireless HD.

REFERENCE SIGNS LIST

1 . . . left-eye video frame data;
2 . . . right-eye video frame data;
3 . . . combined video frame data;
11 . . . HRP preamble;
12 . . . HRP header;
13 . . . MAC header;
14 . . . HCS;
15 . . . packet body;
16 . . . beam tracking;
17a to 17d . . . video control;
18a to 18d . . . subpacket;
20 . . . partition index;
21 . . . interlace field indication;
22 . . . video frame number;
23 . . . H-position;
24 . . . V-position;
41 . . . left-eye video frame data;
42 . . . right-eye video frame data;
43 . . . combined video frame data;

51 ... left-eye top video frame data;
52 ... right-eye top video frame data;
53 ... left-eye bottom video frame data;
54 ... right-eye bottom video frame data;
55 ... combined video frame data;
61 ... left-eye video frame data;
62 ... right-eye video frame data;
63 ... combined video frame data;
91 ... left-eye top video frame data;
92 ... right-eye top video frame data;
93 ... left-eye bottom video frame data;
94 ... right-eye bottom video frame data;
95 ... combined video frame data;
96 ... combined video frame data;
97, 99 ... blanking time interval;
110 ... source device;
111 ... controller;
112 ... audio and visual reproducing apparatus;
113 ... packet processing circuit;
114 ... packet wireless transceiver circuit;
115 ... memory;
115t ... VIC table;
116 ... antenna;
120 ... sink device;
121 ... controller;
122 ... packet wireless transceiver circuit;
123 ... packet processing circuit;
124 ... audio and visual processing circuit;
125 ... loudspeaker;
126 ... display;
127 ... memory;
127t ... VIC table;
128 ... antenna;
141 ... left-eye video frame data;
142 ... right-eye video frame data;
143 ... combined video frame data;
151 ... left-eye top video frame data;
152 ... right-eye top video frame data;
153 ... left-eye bottom video frame data;
154 ... right-eye bottom video frame data;
155 ... combined video frame data;
156 ... combined video frame data;
157 to 159 ... blanking time interval;
161 ... left-eye video frame data;
162 ... right-eye video frame data;
163 ... combined video frame data;
171 ... left-eye video frame data;
172 ... right-eye video frame data;
173 ... combined video frame data;
181 ... left-eye video frame data;
182 ... right-eye video frame data;
183 ... combined video frame data;
201 ... left-eye video frame data;
202 ... right-eye video frame data;
203 ... combined video frame data; and
209 ... banking interval.

The invention claimed is:

1. A source device for transmitting video data to a sink device by using a video frame of a predetermined packet format, the source device comprising:
a first packet processing circuit for generating a plurality of packets; and
a transmitter circuit for transmitting a plurality of generated packets to the sink device,
wherein, when the video data is three-dimensional data including first video frame data and second video frame data, the first packet processing circuit combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data.

2. The source device as claimed in claim 1,
wherein the first packet processing circuit generates the combined video frame data for the horizontal display time interval of the video frame, so as to transmit the first video frame data of a predetermined number of lines for a first half of the vertical display time interval, and thereafter, transmit the second video frame data of the predetermined number of lines for a latter half of the vertical display time interval.

3. The source device as claimed in claim 2,
wherein the first packet processing circuit provides a predetermined blanking time interval between a transmission time interval for the first video frame data of the predetermined number of lines and a transmission time interval for the second video frame data of the predetermined number of lines.

4. The source device as claimed in claim 1, further comprising a controller for inserting format information into a predetermined control command, and transmitting the control command to the sink device,
wherein the format information represents which one of (a) the three-dimensional data and (b) two-dimensional data including third video frame data the video data is.

5. The source device as claimed in claim 1, further comprising:
a first storage unit for previously storing a first video format identification code table including (a) video format identification codes for identifying a plurality of video formats of two-dimensional data including third video frame data and (b) 3D structures for identifying a plurality of video structures of the three-dimensional data; and
a controller for transmitting a video format identification code for identifying the video format of the video data and the 3D structure for identifying the video structure of the video data to the sink device with reference to the first video format identification code table.

6. The source device as claimed in claim 1, further comprising:
a first storage unit for previously storing a first video format identification code table including video format identification codes for identifying (a) a plurality of video formats of two-dimensional data including third video frame data and (b) a plurality of video formats of the three-dimensional data; and
a controller for transmitting a video format identification code for identifying the video format of the video data to the sink device with reference to the first video format identification code table.

7. A sink device for receiving video data from a source device, the source device transmitting the video data by using a video frame of a predetermined packet format,
wherein the source device comprises:
a first packet processing circuit for generating a plurality of packets; and a transmitter circuit for transmitting a plurality of generated packets to the sink device, wherein, when the video data is three-dimensional data including first video frame data and second video frame data, the first packet processing circuit combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data, and wherein the sink device comprises a second packet processing circuit for receiving transmitted packets, and identifying the first video frame data and the second video frame data based on the information on the horizontal position and the information on the vertical position inserted into a plurality of received packets.

8. The sink device as claimed in claim 7, wherein the second packet processing circuit receives format information from the source device, and decodes a plurality of received packets according to received format information, and wherein the format information represents which one of (a) the three-dimensional data and (b) two-dimensional data including third video frame data the video data is.

9. The sink device as claimed in claim 7, further comprising a second storage unit for previously storing a second video format identification code table including (a) video format identification codes for identifying a plurality of video formats of two-dimensional data including third video frame data and (b) 3D structures for identifying a plurality of video structures of the three-dimensional data, wherein the second packet processing circuit receives a video format identification code for identifying the video format of the video data and the 3D structure for identifying the video structure of the video data from the source device, identifies the video format and the video structure with reference to the second video format identification code table based on received video format identification code and 3D structure, and decodes a plurality of received packets according to identified video format and video structure.

10. The sink device as claimed in claim 7, further comprising a second storage unit for previously storing a second video format identification code table including video format identification codes for identifying (a) a plurality of video formats of two-dimensional data including third video frame data and (b) a plurality of video formats of the three-dimensional data, wherein the second packet processing circuit receives a video format identification code for identifying the video format of the video data from the source device, identifies the video format with reference to the second video format identification code table based on a received video format identification code, and decodes a plurality of received packets according to an identified video format.

11. A communication system comprising a source device and a sink device, the source device transmitting video data to the sink device by using a video frame of a predetermined packet format, wherein the source device comprises:

a first packet processing circuit for generating a plurality of packets; and a transmitter circuit for transmitting a plurality of generated packets to the sink device, wherein, when the video data is three-dimensional data including first video frame data and second video frame data, the first packet processing circuit combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data, and wherein the sink device comprises a second packet processing circuit for receiving transmitted packets, and identifying the first video frame data and the second video frame data based on the information on the horizontal position and the information on the vertical position inserted into a plurality of received packets.

12. The communication system as claimed in claim 11, wherein the source device further comprises a controller for inserting format information into a predetermined control command, and transmitting the control command to the sink device, wherein the second packet processing circuit receives the format information from the source device, and decodes a plurality of received packets according to received format information, and wherein the format information represents which one of (a) the three-dimensional data and (b) two-dimensional data including third video frame data the video data is.

13. The communication system as claimed in claim 11, wherein the source device further comprises:

a first storage unit for previously storing a first video format identification code table including (a) video format identification codes for identifying a plurality of video formats of two-dimensional data including third video frame data and (b) 3D structures for identifying a plurality of video structures of the three-dimensional data; and a controller for transmitting a video format identification code for identifying the video format of the video data and the 3D structure for identifying the video structure of the video data to the sink device with reference to the first video format identification code table, wherein the sink device further comprises a second storage unit for previously storing a second video format identification code table including the video format identification codes and the 3D structures, wherein the second packet processing circuit receives a video format identification code for identifying the video format of the video data and the 3D structure for identifying the video structure of the video data from the source device, identifies the video format and the video structure with reference to the second video format identification code table based on received video format identification code and 3D structure, and decodes a plurality of received packets according to identified video format and video structure.

14. The communication system as claimed in claim 11, wherein the source device further comprises:

a first storage unit for previously storing a first video format identification code table including video format identification codes for identifying (a) a plurality of video formats of two-dimensional data including third video frame data and (b) a plurality of video formats of the three-dimensional data; and a controller for transmitting a video format identification code for identifying the video format of the video data to the sink device with reference to the first video format identification code table, wherein the sink device further comprises a second storage unit for previously storing a second video format identification code table including the video format identification codes, and wherein the second packet processing circuit receives a video format identification code for identifying the video format of the video data from the source device, identifies the video format with reference to the second video format identification code table based on a received video format identification code, and decodes a plurality of received packets according to an identified video format.

15. A video data packet transmitting method of transmitting video data from a source device to a sink device by using a video frame of a predetermined packet format, the video data packet transmitting method including:

a first packet processing step of generating a plurality of packets by the source device; and a transmitting step of transmitting a plurality of generated packets to the sink device by the source device, wherein, when the video data is three-dimensional data including first video frame data and second video frame data, the first packet processing step combines the first video frame data with the second video frame data into combined video frame data every video frame, and generates the plurality of packets by dividing the combined video frame data into the plurality of packets according to the packet format so as to insert information on a horizontal position for a horizontal display time interval and information on a vertical position for a vertical display time interval of a first pixel of the combined video frame data stored in the packets, into a header of each packet for transmitting the combined video frame data, as information for identifying the first and second video frame data, and wherein the method further includes a second packet processing step of receiving transmitted packets, and identifying the first video frame data and the second video frame data based on the information on the horizontal position and the information on the vertical position inserted into a plurality of received packets by the sink device.

16. The video data packet transmitting method as claimed in claim 15, wherein the first packet processing step includes a step of generating the combined video frame data for the horizontal display time interval of the video frame, so as to transmit the first video frame data of a predetermined number of lines for a first half of the vertical display time interval, and thereafter, transmit the second video frame data of the predetermined number of lines for a latter half of the vertical display time interval.

17. The video data packet transmitting method as claimed in claim 16, wherein the first packet processing step includes a step of providing a predetermined blanking time interval between a transmission time interval for the first video frame data of the predetermined number of lines and a transmission time interval for the second video frame data of the predetermined number of lines.

18. The video data packet transmitting method as claimed in claim 15, further including a control step of inserting format information into a predetermined control command, and transmitting the control command to the sink device by the source device, wherein the format information represents which one of (a) the three-dimensional data and (b) two-dimensional data including third video frame data the video data is, and wherein the second packet processing step includes a step of receiving the format information from the source device, and decoding a plurality of received packets according to received format information.

19. The video data packet transmitting method as claimed in claim 15, further including:

a step of previously storing a first video format identification code table including (a) video format identification codes for identifying a plurality of video formats of two-dimensional data including third video frame data and (b) 3D structures for identifying a plurality of video structures of the three-dimensional data, in a first storage unit by the source device;

a step of previously storing a second video format identification code table including the video format identification codes and the 3D structures in a second storage unit by the sink device; and a control step of transmitting a video format identification code for identifying the video format of the video data and the 3D structure for identifying the video structure of the video data to the sink device with reference to the first video format identification code table by the source device, wherein the second packet processing step includes a step of receiving a video format identification code for identifying the video format of the video data and the 3D structure for identifying the video structure of the video data from the source device, identifying the video format and the video structure with reference to the second video format identification code table based on received video format identification code and 3D structure, and decoding a plurality of received packets according to identified video format and video structure.

20. The video data packet transmitting method as claimed in claim 15, further including:

a step of previously storing a first video format identification code table including video format identification codes for identifying (a) a plurality of video formats of two-dimensional data including third video frame data and (b) a plurality of video formats of the three-dimensional data in a first storage unit by the source device;

a step of previously storing a second video format identification code table including the video format identification codes in a second storage unit by the sink device; and a control step of transmitting a video format identification code for identifying the video format of the video data to the sink device with reference to the first video format identification code table by the source device, wherein the second packet processing step includes a step of receiving a video format identification code for identifying the video format of the video data from the source device, identifying the video format with reference to the second video format identification code table based on a received video format identification code, and decoding a plurality of received packets according to an identified video format.

* * * * *